(12) United States Patent
Kamiwada et al.

(10) Patent No.: US 7,812,841 B2
(45) Date of Patent: Oct. 12, 2010

(54) DISPLAY CONTROLLING APPARATUS, INFORMATION TERMINAL UNIT PROVIDED WITH DISPLAY CONTROLLING APPARATUS, AND VIEWPOINT LOCATION CONTROLLING APPARATUS

(75) Inventors: Toru Kamiwada, Kawasaki (JP); Takushi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/320,345

(22) Filed: Dec. 29, 2005

(65) Prior Publication Data
US 2006/0103650 A1 May 18, 2006

Related U.S. Application Data

(62) Division of application No. 10/639,517, filed on Aug. 13, 2003, now abandoned.

(51) Int. Cl.
*G06T 15/70* (2006.01)
(52) U.S. Cl. .................................................. 345/474
(58) Field of Classification Search ............ None
See application file for complete search history.

(56) References Cited

U.S. PATENT DOCUMENTS

| | | | | |
|---|---|---|---|---|
| 5,276,785 A | * | 1/1994 | Mackinlay et al. | 345/427 |
| 5,333,254 A | * | 7/1994 | Robertson | 715/853 |
| 5,359,703 A | * | 10/1994 | Robertson et al. | 345/419 |
| 5,678,015 A | * | 10/1997 | Goh | 715/782 |
| 5,898,435 A | | 4/1999 | Nagahara et al. | |
| 5,926,183 A | * | 7/1999 | Menon et al. | 623/2.41 |
| 6,078,329 A | * | 6/2000 | Umeki et al. | 345/419 |
| 6,167,142 A | | 12/2000 | Nozaki et al. | |
| 6,184,884 B1 | | 2/2001 | Nagahara et al. | |
| 6,281,877 B1 | | 8/2001 | Fisher et al. | |
| 6,597,358 B2 | * | 7/2003 | Miller | 345/427 |
| 6,710,788 B1 | * | 3/2004 | Freach et al. | 715/778 |
| 6,828,974 B2 | * | 12/2004 | Dumas et al. | 345/473 |
| 7,137,075 B2 | | 11/2006 | Hoshino et al. | |

(Continued)

FOREIGN PATENT DOCUMENTS

EP 0 471 484 2/1992

(Continued)

OTHER PUBLICATIONS

Foley et al. Computer Graphics: Principles and Practice. Addison-Wesley Pub. Co., Inc. 1997. p. 237-242.*

(Continued)

*Primary Examiner*—Peter-Anthony Pappas
(74) *Attorney, Agent, or Firm*—Staas & Halsey LLP

(57) ABSTRACT

The object of the present invention can be achieved by a display controlling apparatus for displaying a plurality of information objects including an information object shown by a three-dimensional shape in a three-dimensional virtual space. In the display controlling apparatus, a view to display is determined based on a shape of the information object to observe by corresponding to a view movement instruction input by a user as if the view traces a surface of the shape. And display images of the plurality of information objects linked each other are generated based on the view. Then, the display images are displayed at a display unit so as to display the information objects corresponding to the view movement instruction.

6 Claims, 27 Drawing Sheets

U.S. PATENT DOCUMENTS

| | | | | |
|---|---|---|---|---|
| 7,190,365 B2* | 3/2007 | Fleury | .......................... | 345/427 |
| 2004/0085356 A1* | 5/2004 | Kake et al. | .................. | 345/757 |
| 2004/0150646 A1* | 8/2004 | Oka | ........................... | 345/502 |

FOREIGN PATENT DOCUMENTS

| | | |
|---|---|---|
| EP | 0 767 418 A1 | 4/1997 |
| JP | 9-91109 | 4/1997 |
| JP | 10-232757 | 9/1998 |
| JP | 11-039132 | 2/1999 |
| JP | 11-154244 | 6/1999 |
| JP | 2000-20754 | 1/2000 |
| JP | 2000-39949 | 2/2000 |
| JP | 2000-172248 | 6/2000 |
| JP | 2000-322591 | 11/2000 |
| WO | 97/37294 | 10/1997 |

OTHER PUBLICATIONS

G. G. Robertson, et al., "Information Visualization Using 3D Interactive Animation", Communications of the Association for Computing Machinery, Vol. 36, No. 4, Apr. 1, 1993, pp. 57-71.

G. G. Robertson, et al., "The Cognitive Coprocessor Architecture for Interactive User Interfaces", Symposium on User Interface Software and Technology, Nov. 13, 1989, pp. 10-18.

Partial European Search Report, dated Aug. 4, 2006, for related European Patent Application No. EP 01 93 6878.

Ritter et al., "Using a 3D puzzle as a metaphor for Learning Spatial Relations" Graphics Interface. 2000.

European Search Report, dated October 6, 2006, for related European Application No. 01936878.6-2218.

Office Action dated Nov. 25, 2005, issued in corresponding U.S. Appl. No. 10/639,517.

Office Action dated Mar. 21, 2006, issued in corresponding U.S. Appl. No. 10/639,517.

Office Action dated Sep. 7, 2006, issued in corresponding U.S. Appl. No. 10/639,517.

Office Action dated Jan. 18, 2007, issued in corresponding U.S. Appl. No. 10/639,517.

Office Action dated Apr. 6, 2007, issued in corresponding U.S. Appl. No. 10/639,517.

Office Action dated Jan. 8, 2008, issued in corresponding U.S. Appl. No. 10/639,517.

Office Action dated Sep. 16, 2008, issued in corresponding U.S. Appl. No. 10/639,517.

Office Action dated Mar. 2, 2009, issued in corresponding U.S. Appl. No. 10/639,517.

Office Action dated May 26, 2009, issued in corresponding U.S. Appl. No. 10/639,517.

* cited by examiner

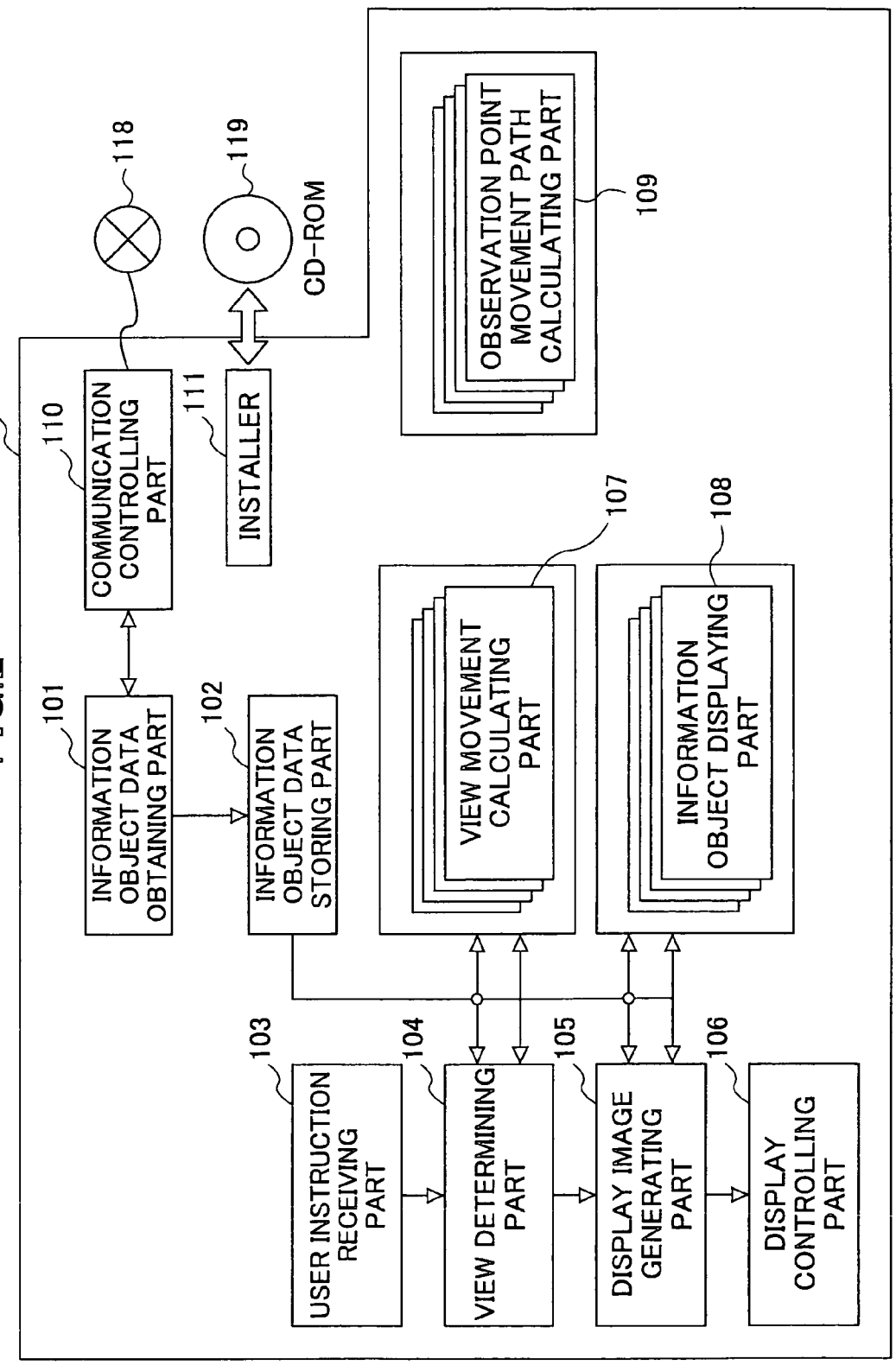

TARGET SURFACE 422

TARGET SURFACE 421

DISPLAY CONTROLLING APPARATUS, INFORMATION TERMINAL UNIT PROVIDED WITH DISPLAY CONTROLLING APPARATUS, AND VIEWPOINT LOCATION CONTROLLING APPARATUS

This is a Divisional Application of Ser. No. 10/639,517, filed Aug. 13, 2003, now abandoned claiming foreign priority benefit of JP 2001-048770, filed Feb. 23, 2001, the disclosures of which are incorporated herein by reference.

TECHNICAL FIELD

The present invention provides a display control apparatus that enables smooth viewpoint movement and to search an object by an intuitive operation in a space in which a plurality of information objects have different dimensions and shapes, and that realizes a proper movement direction and a proper movement speed based on geometric information of the object.

Moreover, the present invention relates to an information terminal unit provided with a display controlling apparatus and a display controlling program controlling a computer to conduct processes at the display controlling apparatus.

BACKGROUND ART

Japanese Laid-Open Patent Application No. 2000-172248 by the inventor of the present invention is known as a three-dimensional display controlling apparatus that provides a comfortable environment for browsing an electronic document with hypertext structure on a display unit. In this invention, an electronic document group with hypertext structure is arranged in a single virtual space based on its like structure, a display image to browse the electronic document is generated based on a view defined in the virtual space and displayed at the display unit. Moreover, in accordance with an instruction by a user, a view is consecutively changed so as to consecutively generate and display the display image at the display unit at real time based on the view at the time. Thereby, the user can browse a document by following links of hypertext so as to consecutively enlarge the document, while the user consecutively changes the view in the virtual space.

A variation example of a display screen is shown in FIG. 1. An electronic document 602 is linked by the hypertext structure from an electronic document 601, and further an electronic document 603 is linked. A screen example 62 is displayed by zooming in from a state of a screen example 61, and further a screen example 63 is displayed by zooming in.

On the other hand, a method has already been devised in that the three-dimensional product catalog is distributed through the Internet, and the three-dimensional shape is displayed at a terminal side while the three-dimensional shape is being rotated or a like on a screen by the operation of the user. It is called a Web3D as a typical method in that the three-dimensional shape such as a product is distributed from a server on the Internet to a user terminal in a VRML (Virtual Reality Modeling Language) form or a special form, and the three-dimensional shape is displayed on the screen at the user terminal by a program for displaying such as three-dimensional shape. A display object is selected by selecting an item by using a mouse on an HTML document displayed at a general WWW browser. That is, the program is to display a single three-dimensional shape. Also, the program is realized as a plug-in of a browser. A Java™ program, or an ActiveX object.

However, in a conventional three-dimensional display controlling apparatus as described above, there are problems described below.

In the conventional three-dimensional display controlling apparatus, the single three-dimensional shape can be displayed, rotated, and partially enlarged in a window of the browser. Therefore, before the shape is displayed, it is needed to click an option by the mouse, select a menu, conduct a search condition in order to select the display object.

DISCLOSURE OF INVENTION

It is a first object of the present invention to provide a display controlling apparatus in that a viewpoint can be smoothly moved and a target object can be searched for by an intuitive operation in a space where a plurality of information objects having different dimensions and shapes.

Moreover, it is a second object of the present invention to provide an information terminal unit provided with the display controlling apparatus.

Furthermore, it is a third object of the present invention to provide a viewpoint location controlling apparatus that realizes a proper movement direction and a proper movement speed based on geometric information of the information object subject to be the viewpoint movement in the space where the plurality of information objects having different dimensions and shapes.

The first object of the present invention are achieved by a display controlling apparatus for displaying a plurality of information objects in a three-dimensional virtual space, the plurality of information objects successively linking each other and including an information object shower by a three-dimensional shape, the display controlling apparatus including: a view determining part determining a view to display as if tracing a surface of a shape based on the shape of the information object to observe by corresponding to a view movement instruction input by a user; and a display image generating part generating display images of the plurality of information objects linked each other based on the view determined by the view determining part, wherein the display images are displayed at a display unit so as to display the information objects corresponding to the view movement instruction.

In such the display controlling apparatus, display images representing the plurality of information objects linked each other is generated based on the view determined based on the shape of the information object observed by a user and is displayed at the display unit.

Accordingly, since a different view can be determined for each shape of the information objects, it is possible to display the display images in a three-dimensional virtual space by corresponding to the view movement input by the user as if the view traces on the surface of the information object.

The above-described information object may be an information object shown in the three-dimensional virtual space on the display unit by an electronic document having a hypertext structure provided through the Internet.

From an aspect in that the information object to observe can be switched to another information object based on the movement direction, the present invention can be arranged to include a link information managing part managing a relative location relationship and a relative scale ratio of each of the information objects in the three-dimensional virtual space as link information, wherein while the view determining part switches the information object to observe to the information object arranged in a movement direction indicated by the view management instruction based on the link information, the view determining part determines the view based on the shape of the switched information object, and the display image generating part select the information object to display from the plurality of the information objects linked each other based on the location relationship and the scale ratio and generates the display images.

In such the display controlling apparatus, the information object to observe is switched to another information object arranged in a movement direction based on the link information, and also the information objects to display are selected based on the location relationship and the scale ratio of the link information.

Accordingly, it is possible to automatically select the information object to be observed and other information objects to display based on a location relationship of the link information and the scale ratio in response to the movement direction such as a upward, downward, rightward, leftward, zoom-in, or zoom-out direction. Therefore, in response to the view movement, it is possible to smoothly display the information objects with successively tracing the information objects that are successively linked each other.

From another aspect in that the view movement can be conducted based on shapes of the information objects having different dimensions, the present invention can be arranged so that the view determining part includes: an observation point movement path calculating part calculating a movement path of an observation point based on a three-dimensional shape of the information object; and a view movement calculating part calculating the view movement based on the shape of the information object, wherein when the information object to observe is the three-dimensional shape, the view movement calculating part calculates the view movement based on a calculation result by the observation point movement path calculating part.

In such the display controlling apparatus, when the information object to be observed is a three-dimensional shape, the view movement is calculated based on a calculation result of the movement of the observation point. Therefore, it is possible to conduct the view movement based on each shape of the information objects having different dimensions. Also, it is possible to calculate the movement path of the observation point as if a curved surface is traced.

Moreover, the first object of the present invention can be achieved by a display controlling program for causing a computer to display the plurality of information objects in the three-dimensional virtual space, and also by a computer-readable recording medium with program code for causing a computer to display the plurality of information objects in the three-dimensional virtual space.

The second object of the present invention are achieved by an information terminal unit provided with the display controlling apparatus as claimed in any one of claims 1 through 4, including an instruction receiving part receiving a view movement instruction in the three-dimensional virtual space by an operation of a user in a view movement direction.

In such the information terminal unit, it is possible to display the information objects in the three-dimensional virtual space at real time based on the view movement instruction according to an operation directing the view movement by the user.

The second object of the present invention are achieved by a viewpoint location controlling apparatus for controlling a viewpoint location with respect to the plurality of the information objects having shapes displayed in a three-dimensional virtual space, the viewpoint location controlling apparatus including: a reference determining part determining the information object to display at a nearest location from the viewpoint location in accordance with an input by a user; and a speed changing part changing a movement speed of the view by corresponding to a length of a distance from the determined reference object to the viewpoint location, wherein based on the reference information object, the viewpoint location is controlled so as to move the viewpoint at the movement speed corresponding to the distance to the viewpoint location, and the plurality of the information objects are displayed.

In such the viewpoint location controlling apparatus, since the information object at the closest location to the viewpoint location is determined as the reference information object, it is possible to determine the information object that is subject for the viewpoint to observe. Also, the viewpoint location is controlled by the speed changing part so that the viewpoint is moved at the movement speed corresponding to the distance to the viewpoint location. Accordingly, when the viewpoint location is approaching near the information object, the viewpoint is slowly moved. On the other hand, when the viewpoint is far from the information object, it is possible to display the plurality of information objects so that the viewpoint is quickly moved.

Moreover, the third object of the present invention can be achieved by a viewpoint location controlling program for causing a computer to control a viewpoint location with respect to the plurality of the information objects in the three-dimensional virtual space, and also by a computer-readable recording medium with program code for causing a computer to control a viewpoint location with respect to the plurality of the information objects in the three-dimensional virtual space.

BRIEF DESCRIPTION OF DRAWINGS

FIG. 2 is a diagram showing an example of a functional configuration of a display controlling apparatus.

BEST MODE FOR CARRYING OUT THE INVENTION

Figure 1:
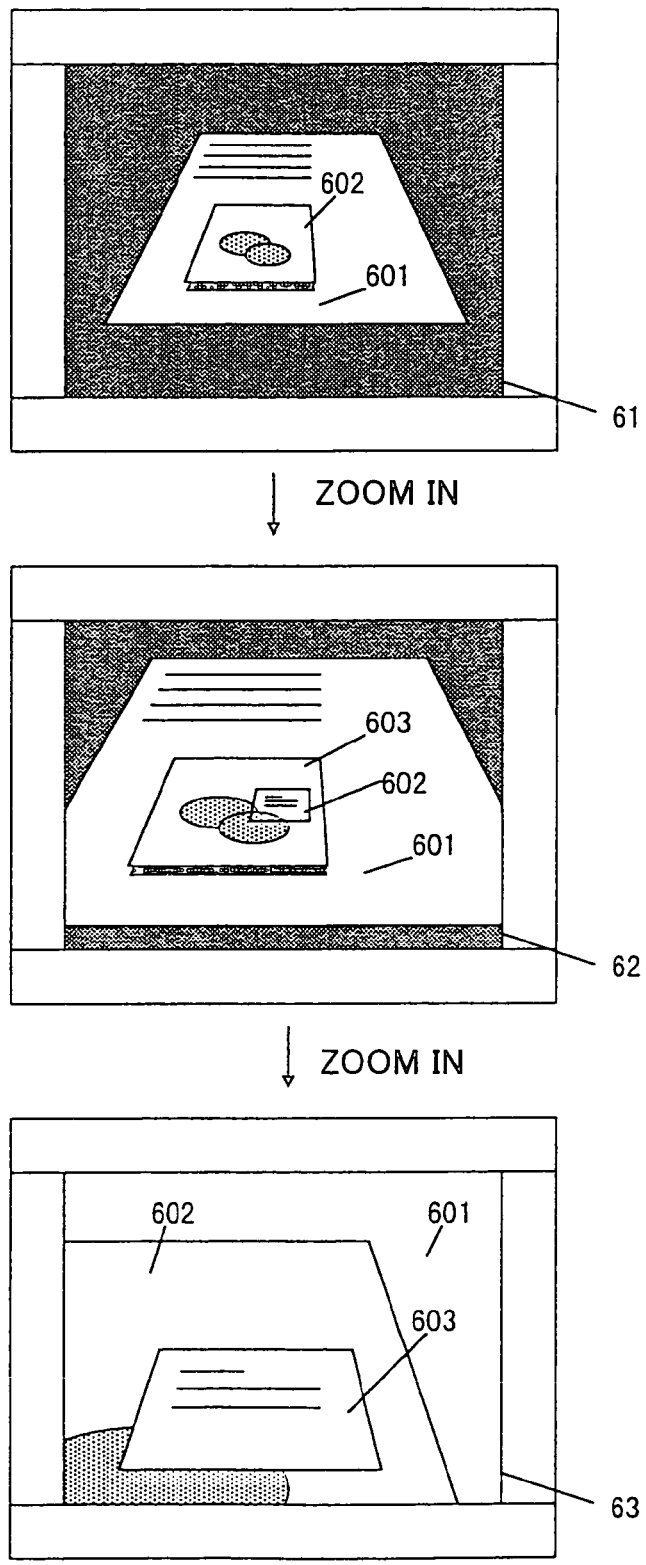
FIG. 1 is a diagram showing change examples of a conventional display screen.

In the following, embodiments according to the present invention will be described with reference to the drawings.

FIG. 2 is a diagram showing an example of a functional configuration of a display controlling apparatus.

Referring to FIG. 2, a display controlling apparatus 100 includes an information object data obtaining part 101, an information object data storing part 102, a user instruction receiving part 103, a view determining part 104, a display image generating part 105, a display controlling part 106, a plurality of view movement calculating parts 107, a plurality of information object displaying parts 108, an observation point movement path calculating part 109, a communication controlling part 110, and an installer 111.

The information object data obtaining part 101 obtains information object data from Web information obtained through a network 118, such as the Internet, by the communication controlling part 110, and stores the obtained information object data in the information object data storing part 102. Moreover, as link information that defines a correlation between information objects, a relative position relationship and a scale ratio within a virtual space are stored.

The user instruction receiving part 103 receives data showing a view movement direction indicated by a user.

Based on the data showing the view movement direction received by the user instruction receiving part 103, in response to a shape of the information object that is to be processed and is stored in the information object data storing part 102, the view determining part 104 determines a view by using a calculation result of the view movement calculating part 107 and the observation point movement path calculating part 109.

Based on view data determined by the view determining part 104, the display image generating part 105 generates all display images of the information objects displayed in a range of the view in response to the shape of each information object.

The display controlling part 106 controls a display unit in order to display the display image generated by the display image generating part 105. That is, the display controlling part 106 generates the display image data on which an information object is displayed, based on the view data by using information object displaying part 108 corresponding to the shape of each information object.

The view movement calculating part 107 calculates a view movement amount including a movement distance, an angle change, and movement direction information, corresponding to the shape of an information object. However, when the shape of the information object is a spherical surface or a free form surface, after the movement path of the observation point is calculated by the observation point movement path calculating part 109 according to the shape of an information object, the view movement amount is calculated.

By providing the plurality of the view movement calculating parts 107 and the information object displaying parts 108, the view movement and information object suitable for each of the information object of various aspects such as a planar information object, solid information object, and a like can be displayed.

The communication controlling part 110 controls a connection and disconnection to the network 118, and controls to send and receive data.

For example, the installer 111 installs a program for executing processes conducted by each processing part described above that control the display controlling apparatus 100, from a CD-ROM 119 that is a computer-readable storage medium.

The installed program is executed by a CPU (Central Processing Unit) of the display controlling apparatus 100 and realizes each processing part described above. A medium storing the program is not limited to the CD-ROM 119 but any computer-readable medium can be used.

If necessary, in order to correspond to various shapes of the information objects, the view movement calculating part 107 and the information object displaying part 108 may be obtained from the network 118, the CD-ROM 119, or a like, and be used by the determining part 104 and the display image generating part 105.

The viewpoint movement with respect to the information object will be described with reference to FIG. 3 and FIG. 4. FIG. 3 is a diagram for explaining the viewpoint movement with respect to a planer information object. FIG. 4 is a diagram for explaining the viewpoint movement with respect to the solid information object.

In FIG. 3 and FIG. 4, a target surface 401 on the information object shows a target surface that is subject for the viewpoint to zoom in. A viewpoint location 402 shows a current viewpoint location of a user. An observation point 403 shows a location to be observed on the information object within a current view of the user. It should be noted that the observation point 403 is a intersection of a center line of the view and the target surface.

Figure 4A:
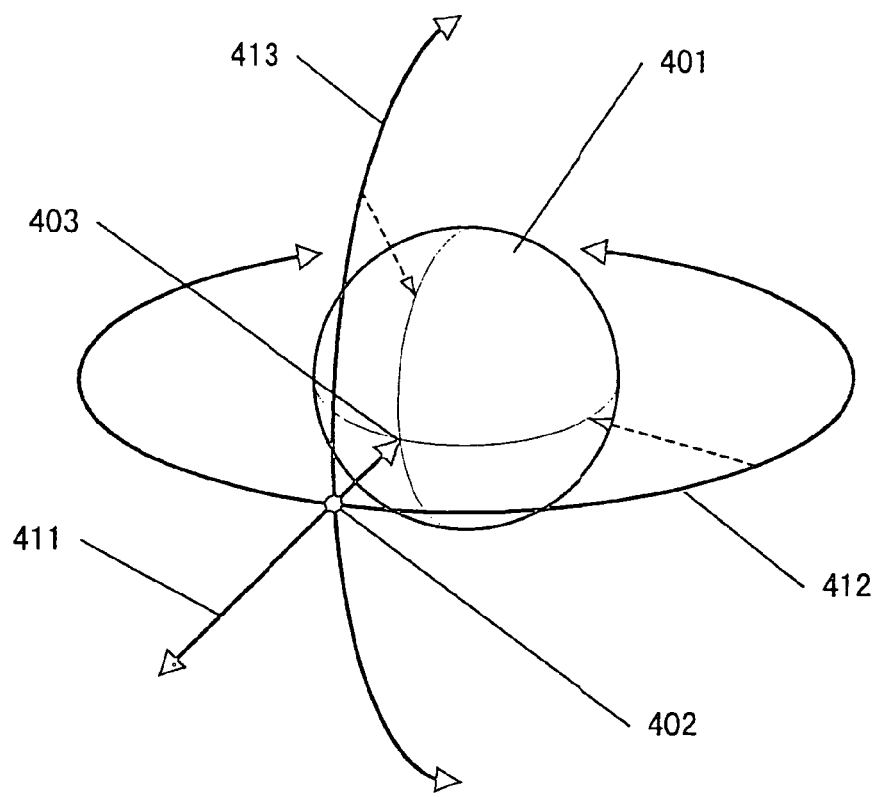
FIG. 4A is a diagram for explaining a viewpoint movement in a case of moving in parallel with respect to a three dimensional information object.
Figure 4B:
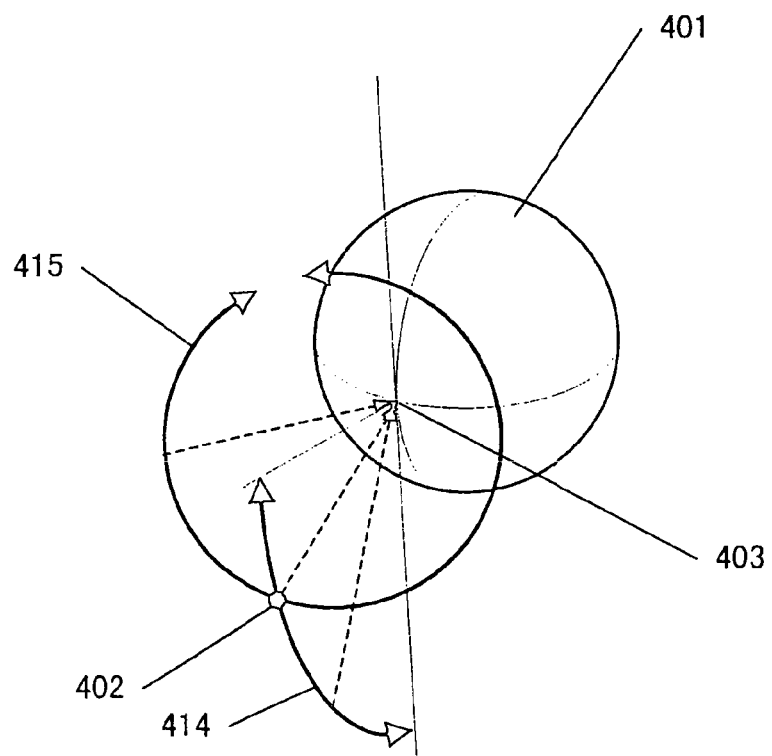
FIG. 4B is a diagram for explaining the viewpoint movement in a case of conducting a tilt operation with respect to the solid information object.

The viewpoint movement path 411 shows movement paths of the viewpoint accompanying a zoom-in operation and a zoom-out operation. The viewpoint movement path 412 shows movement paths of the viewpoint accompanying a right movement operation and a left movement operation. The viewpoint movement path 413 shows movement paths of the viewpoint accompanying an upward movement operation and a downward movement operation. The viewpoint movement path 414 shows movement paths of the viewpoint accompanying tilt operations. The viewpoint movement path 415 shows movement paths of the viewpoint accompanying rotation operations. Moreover, dashed line arrows in FIG. 4A and FIG. 4B shows examples of visual lines when the viewpoint in the view moves along each viewpoint movement path. Tips of the dashed line arrows show observation points at that time.

When the zoom-in operation is conducted, the viewpoint infinitely approaches the observation point 403 on the target surface 401 along the movement path 411. Moreover, when the zoom-out operation is conducted, the viewpoint moves so as to distance far from the target surface along the movement path 411. In these zooming operations, a movement speed of the viewpoint changes in proportion to the distance between the viewpoint and the target surface. Accordingly, it seems that the viewpoint is infinitely approaching the observation point on the target surface, so as to realize a zoomed display.

When the view movement operation is conducted to right and left, and up and down, the viewpoint moves along routs shown in the viewpoint movement paths 412 and 413, respectively. At this time, the observation point 403 moves on the target surface.

Figure 3A:
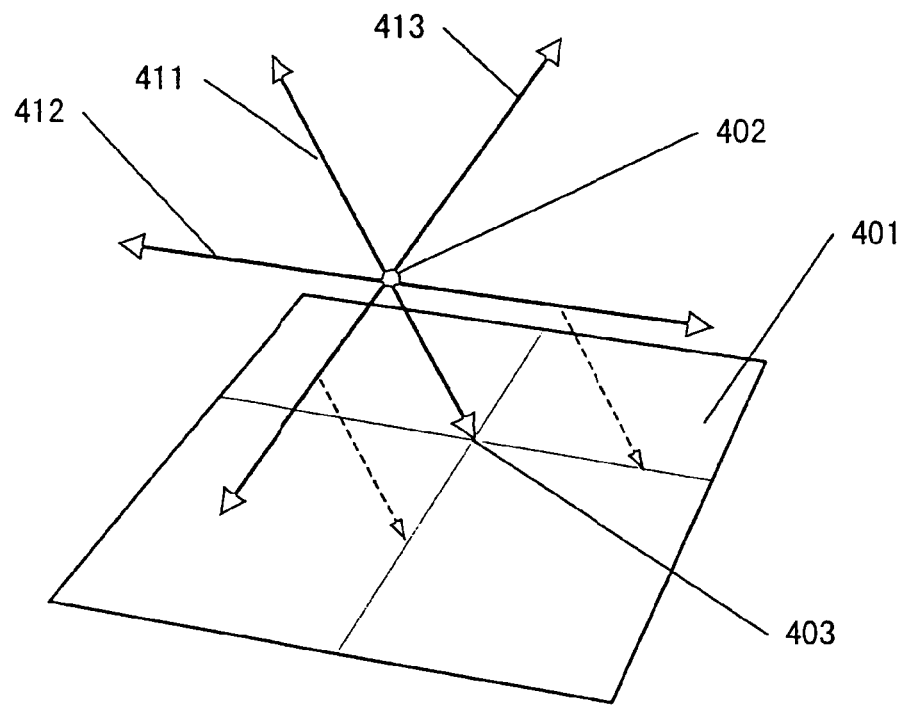
FIG. 3A is a diagram for explaining a viewpoint movement in a case of moving in parallel with respect to a plane information object.

Referring to FIG. 3A, in the target surface 401 being plane, the display controlling apparatus 100 moves the viewpoint location 402 and the observation point 403 based on information showing the direction of the view movement from the user instruction receiving part 103 in FIG. 2 so that the visual line moves toward the target surface 401 in parallel.

On the other hand, referring to FIG. 4A, in the target surface 401 being solid, the display controlling apparatus 100 moves the viewpoint location 402 and the observation point 403 based on information showing the direction of the view movement from the user instruction receiving part 103 in FIG. 2 so that the visual line traces the target surface 401. That is, the viewpoint location 402 and the observation point 403 are moved while a tilt angle between a direction of the visual line and the target surface is maintained at constant.

Figure 3B:
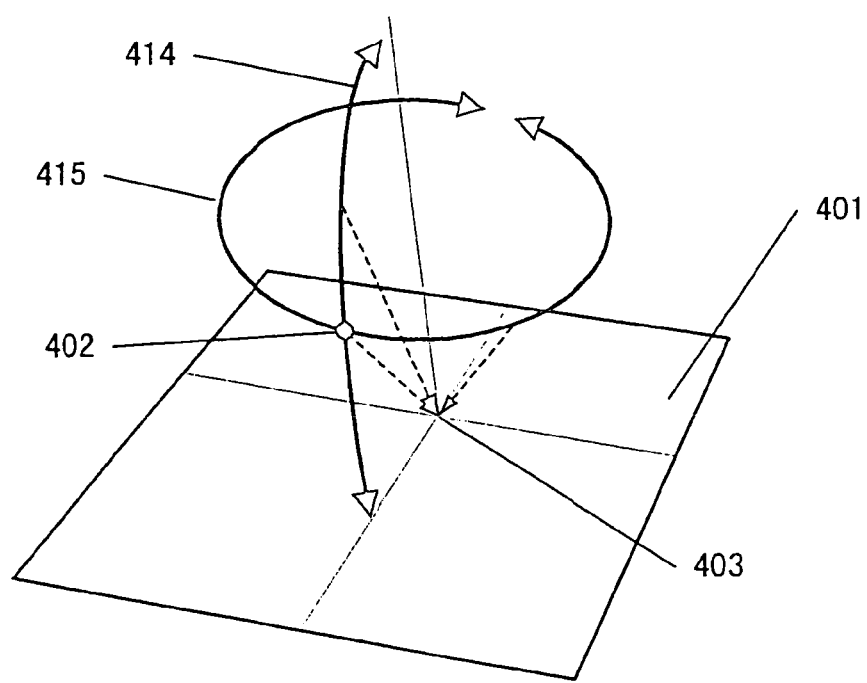
FIG. 3B is a diagram for explaining the viewpoint movement in a case of conducting a tilt operation with respect to the plane information object.

Referring to FIG. 3B and FIG. 4B, when the user conducts the tilt operations for the view, the display controlling apparatus 100 moves based on the information showing the direction of the view movement from the user instruction receiving part 103 of FIG. 2 along the viewpoint movement path 414 in which the distance between the viewpoint location 402 and the observation point 403 becomes constant. That is, at a constant distance between the viewpoint location 402 and the observation point 403, the display controlling apparatus 100 moves the viewpoint location 402, while changing an angle of the direction of the visual line, which connects the viewpoint location 402 and the observation point 403, and the target surface 401.

Moreover, when the rotation operation for the view is conducted, the viewpoint location 402 is moved along the viewpoint movement path 415. That is, in the rotation operation, the display controlling apparatus 100 maintains a location of the observation point 403, and the distance and the tilt angle from the observation point 403 to the viewpoint location 402 to be constant, and the display controlling apparatus 100 moves the view so as to rotate centering on a perpendicular to the target surface in the observation point 403.

In order to make a process possible even if the display object has an information object shape having a spherical surface other than a flat surface as described above, it is necessary to allocate a proper shape of the target surface beforehand. It is not necessary that the target surface shape always corresponds to the information object shape. For example, the target surface being spherical can be allocated to the information object being near globular but irregular.

In the following, a process for each different target surface will be described with reference to FIG. 5, FIG. 6, and FIG. 7.

Figure 5:
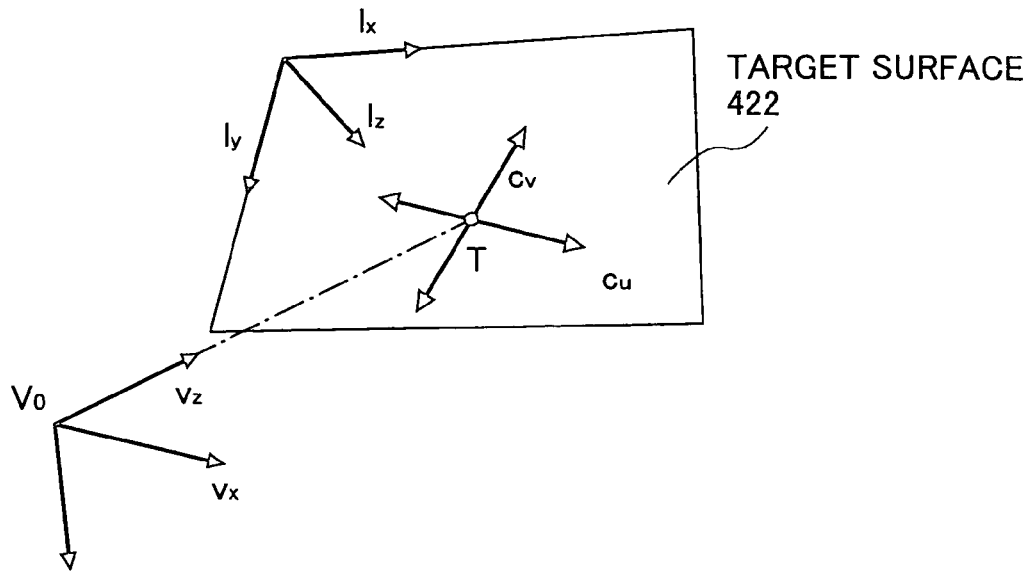
FIG. 5 is a diagram for explaining a view movement to a target surface being plane.

FIG. 5 is a diagram for explaining the view movement to the target surface being plane. FIG. 6 is a diagram for explaining the view movement to the target surface being spherical. FIG. 7 is a diagram for explaining the view movement to the target surface being a free form.

Figure 6:
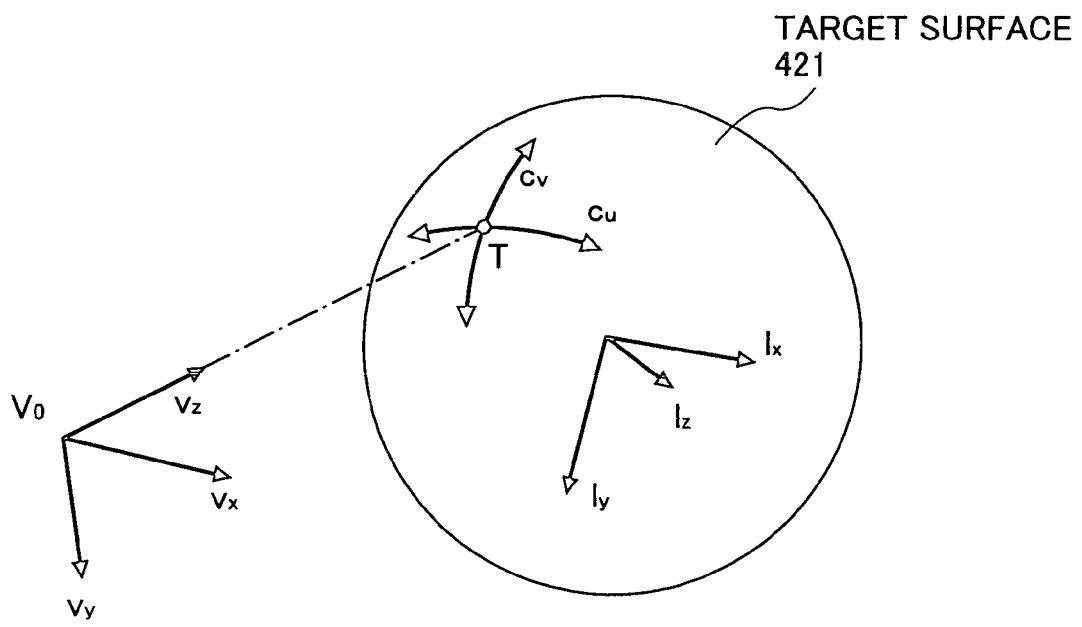
FIG. 6 is a diagram for explaining the view movement to a target surface being spherical.
Figure 7:
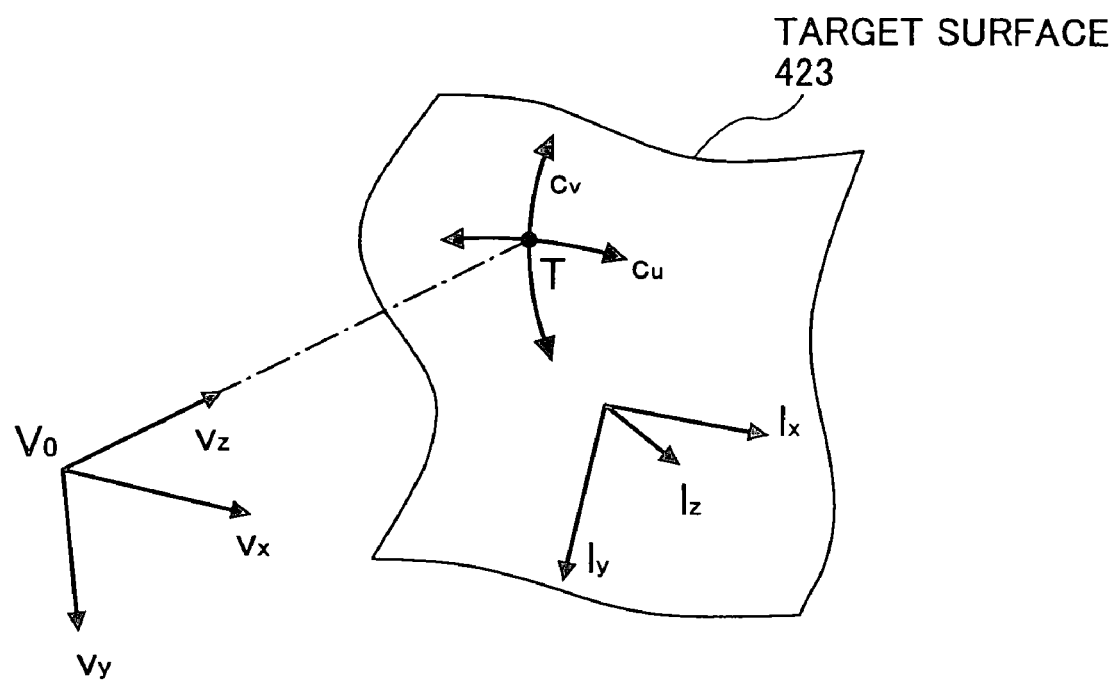
FIG. 7 is a diagram for explaining the view movement to a target surface being a free form.

In FIG. 5, FIG. 6, and FIG. 7, lx, ly, and lz denote vectors defining x axis, y axis, and z axis, respectively, of a local coordinate system of the information object.

And Vx, Vy, and Vz denote vectors representing x axis, y axis, and z axis, respectively, of the viewpoint coordinate system. V0 is a location of the viewpoint, that is, V0 denotes an origin of the viewpoint coordinate system. And the observation point on the target surface is denoted by T. A straight line connecting the viewpoint V0 and the observation point T is called the visual line, and the view is defined so that the visual line becomes a centerline of the view. That is, the view is defined so that the observation point comes to a center of the screen.

Moreover, the direction of the view is defined so that the vector Vx corresponds to a screen horizontal right direction and the vector Vy corresponds to screen perpendicular down direction. The movement directions of the observation point corresponding to the view movement instruction by the user, which indicates right and left and up and down, respectively, are shown by lines Cu and Cv with arrows. A direction of Cu is defined as a direction based on the target surface shape of the line of intersection of an xz plane and the target surface of the viewpoint coordinate system. A direction of Cv is defined as a direction based on the target surface shape of the line of intersection of a yz plane and the target surface of the viewpoint coordinate system.

Moreover, in the view movement to up and down or right and left, in order not to change the tilt angle and a rotation angle of the view over the target surface, the observation point is moved along the target surface.

In an example of the target surface 421 being plane as shown in FIG. 5, the above-mentioned operation can be realized by a similar method disclosed in the Japanese Laid-Open Patent Application No. 2000-172248. Accordingly, the view determining part 104 shown in FIG. 2 determines so as to move the view simply along the movement path Cu or Cv in parallel.

The example of the target surface 422 being spherical as shown in FIG. 6 and the example of the target surface 423 being a free form as shown in FIG. 7, when different from the plane in FIG. 5 based on a calculation result of the view movement calculating part 107, the view is moved to right and left or up and down, the view determining part 104 shown in FIG. 2 determines so as to move the movement path Cu or Cv of the observation point T along a curve line, instead of a straight line. Therefore, without changing the tilt angle or the rotation, whenever the observation point T moves, it is necessary to change the direction of the visual line connecting the viewpoint V0 and the observation point T. Accordingly, not only moving the view in parallel, the movement path Cu or Cv of the observation point T is determined so as to move along the curve line while changing the direction of the viewpoint coordinate system. Moreover, in other than the observation point T, the movement paths Cu and Cv are not necessary to correspond to the line of intersection of the xz plane or the yz plane of the viewpoint coordinate system and the target surface. Consequently, the observation point movement path Cu or Cv is calculated for each kind of curved surface.

First, a process for moving the view to up, down, right, and left in a case in which the target surface is a plane will be described.

Figure 8:
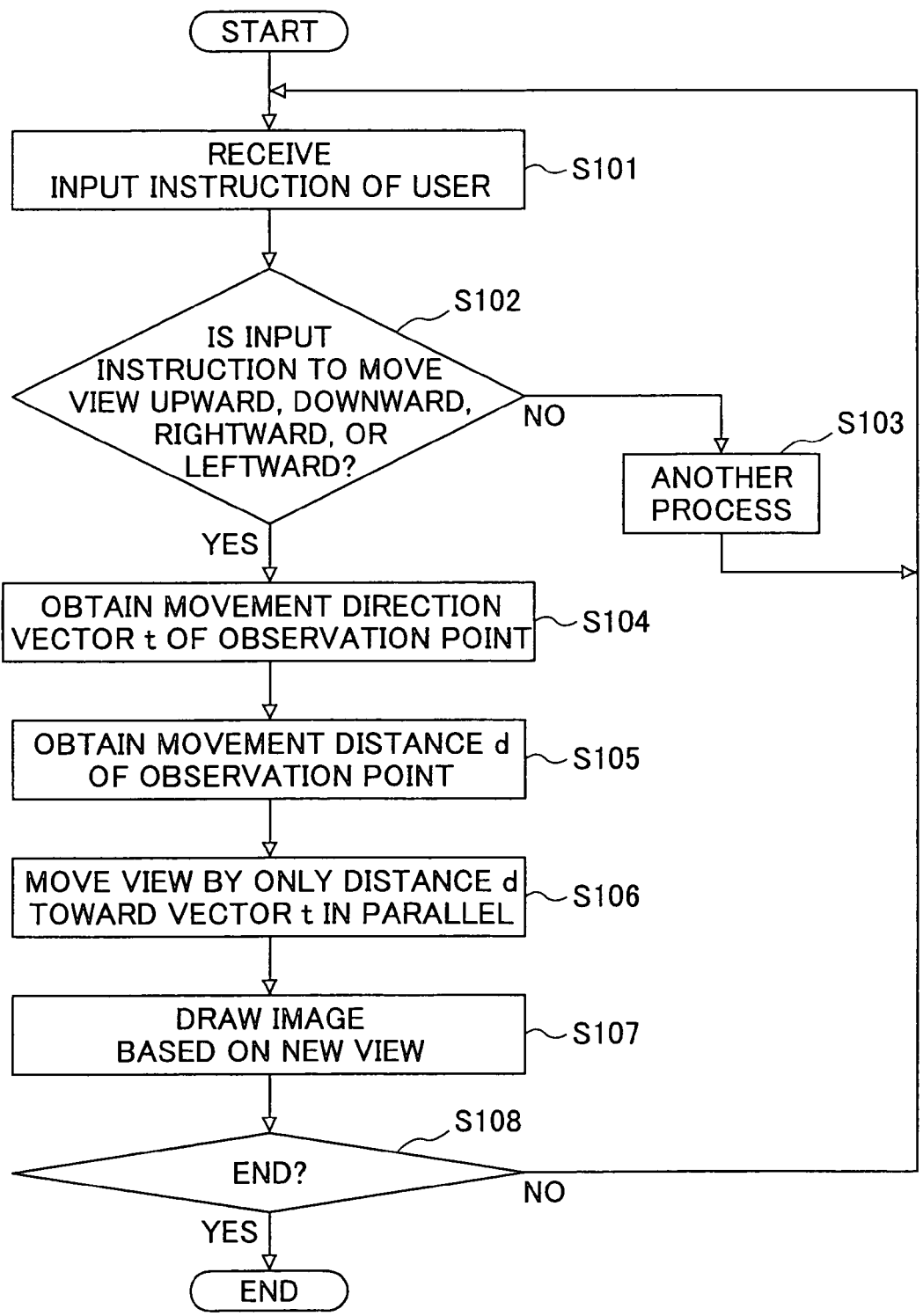
FIG. 8 is a flowchart diagram for explaining a process of the view movement with respect to the target surface being plane.

FIG. 8 is a flowchart diagram for explaining the process of the view movement with respect to the target surface being plane.

Referring to FIG. 8, the user instruction receiving part 103 in FIG. 2 receives an input instruction of a user (step S101), and determines whether or not the input instruction of the user is a movement instruction to move the view upward, downward, leftward, or rightward (step S102).

When it is determined that the input instruction of the user is not the movement instruction to move the view upward, downward, leftward, and rightward, the user instruction receiving part 103 executes a step S103, and conducts a process corresponding to the input instruction of the user (step S103). The process goes back to the step s101 and waits for a next input instruction of the user.

On the other hand, when the user instruction receiving part 103 decides that the input instruction of the user is the movement instruction to move the view upward, downward, leftward, and rightward, the user instruction receiving part 103 activates the view determining part 104, and executes a step S104. In the step S104, the movement direction vector t of the observation point T is obtained.

For example, when the user instructs to move the view rightward, the view determining part 104 activated by the user instruction receiving part 103 obtains a direction vector of the line of intersection of the xy plane of the viewpoint coordinate system and the target surface in the observation point T, and determines the direction vector as the movement direction vector t. It should be noted that a positive direction is chosen for the movement direction vector T so as not to be an obtuse angle between the movement direction vector T and the vector Vx.

In a step S105, a movement distance d of the observation point T is calculated. That is, the view determining part 104 calculates the movement distance d by giving the obtained the movement direction vector t to the view movement calculating part 107. The view movement calculating part 107 calculates the movement distance d of the observation point T from the movement direction vector t given from the view determining part 104 based on data of the information object of the plane, which is obtained from the information object data storing part 102 and currently displayed on the display unit.

In a step S106, the view determining part 104 moves the view toward the vector t in parallel by the distance d calculated by the view movement calculating part 107.

In a step S107, the display image generating part 105 generates a drawing based on view data that are obtained from the view determining part 104 and moved in parallel. The display controlling part 106 displays the drawing corresponding to a new view on the display unit based on drawing data generated by the display image generating part 105.

In a step S108, it is determined whether or not it is an end of the process. When it is determined that it is the end of the process, the process is terminated. On the other hand, when it is determined that it is not the end of the process, the process goes back to the step S101 and receives a next input instruction by the user.

Next, a process for the view movement upward, downward, rightward, or leftward in a case in which the target surface is a curved surface will be described. When the target surface is a curved surface shown in FIG. 6 or FIG. 7, a different process from the case where the target surface is the plane is needed.

Figure 9:
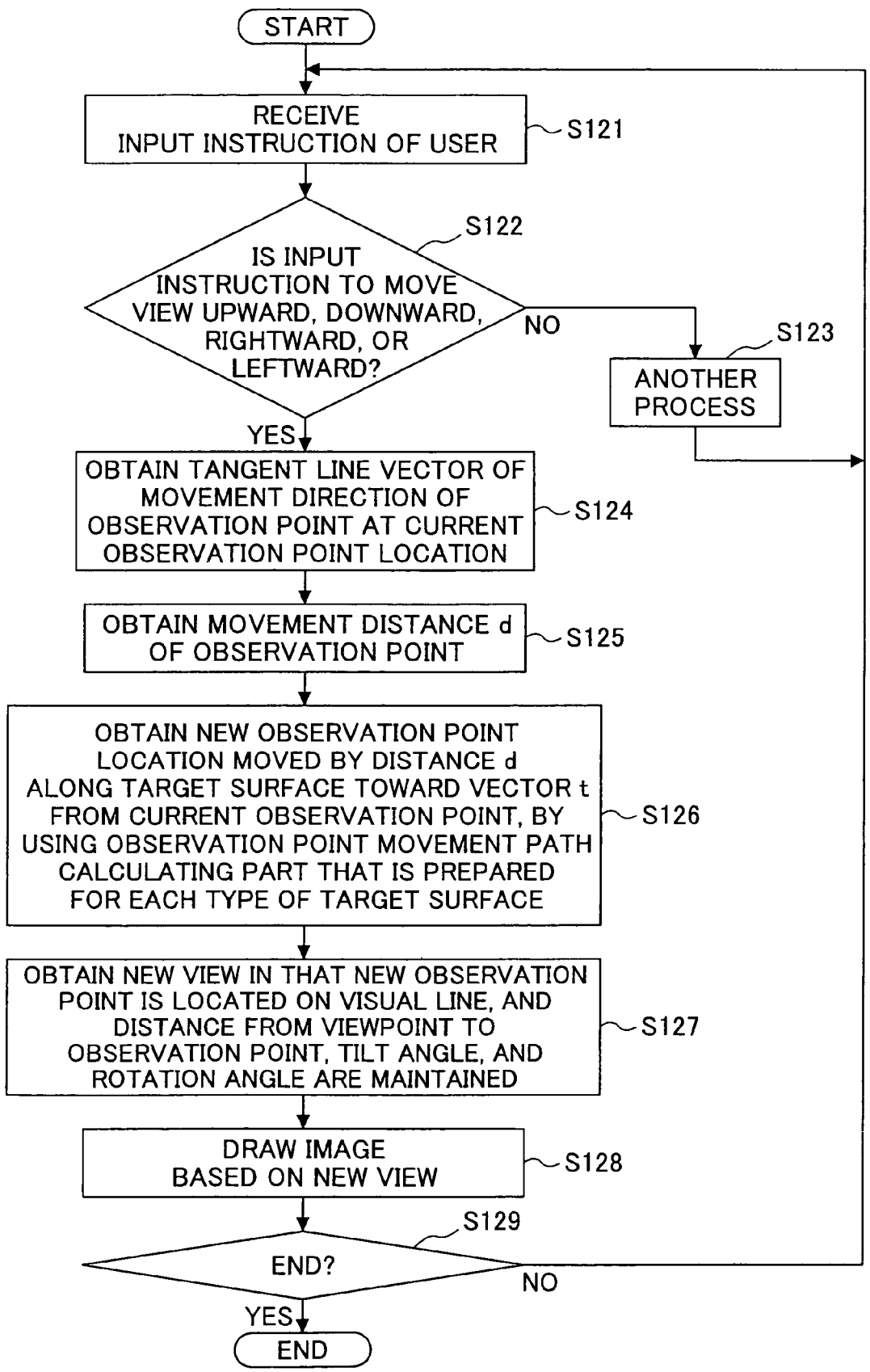
FIG. 9 is a flowchart diagram for explaining a process of the view movement with respect to target surface being the spherical surface or the free form surface.

FIG. 9 is a flowchart diagram for explaining the process of the view movement with respect to target surface being the spherical surface or the free form surface as the curved surface.

Referring FIG. 9, the user instruction receiving part 103 in FIG. 2 receives the input instruction of the user (step S121), and determines whether or not the input instruction is the movement instruction to go upward, downward, rightward, or leftward (step S122).

When it is determined that the input instruction of the user is not the movement instruction of the view upward, downward, rightward, or leftward, the user instruction receiving part 103 executes the step S103, conducts a process corresponding to the input instruction of the user (step S123), and goes back to the step S121 to waits for the next input instruction of the user.

On the other hand, when it is determined that the input instruction of the user is the movement instruction of the view upward, downward, rightward, or leftward, the user instruction receiving part 103 activates the view determining part 104, and executes a step S124. In the step S124, the user instruction receiving part 103 obtains for the tangent vector t of the movement direction of a current observation point T at the location of a current observation point T.

For example, when the instruction is made to move the view rightward, the view determining part 104 activated by the user instruction receiving part 103 obtains a tangent direction vector being a line of the intersection of the xy plane of the viewpoint coordinate system and the target surface at the observation point T, and sets the tangent direction vector as the movement direction vector t. It should be noted that the movement direction vector t is selected to be a positive direction so as not to be the obtuse angle with respect to the vector Vx.

In the step S125, the movement distance d of the observation point T is calculated. That is, the view determining part 104 calculates the movement distance d by giving the movement direction vector t obtained in the step S124 to the view movement calculating part 107. The view movement calculating part 107 calculates the movement distance of an observation point according to the distance of the viewpoint V0 and the observation point T based on data of the information object having the curved surface, which is obtained from the information object data storing part 102 and is currently displayed on the display unit.

In the step S126, furthermore, the view determining part 104 searches for a point which moves only by the distance d in the positive direction t along the target surface from the current observation point T as a new observation point T by using the observation point movement path calculating part 109, which is prepared corresponding to a type of the curved surface, based on data of the information object having the curved surface, which is obtained from the information object data storing part 102 and is currently displayed on the display unit.

In a step S127, the view determining part 104 searches for a view corresponding to a new observation point by using the view movement calculating part 107 so that the tilt angle and the rotation angle in a current view are stored.

In this method, for example, a location of the viewpoint V0 and a direction of the Vector Vz are determined so that the visual line crosses the observation point newly obtained while maintaining the distance from the view to the observation point, the tilt angle, and the rotation angle. Then, the directions of Vectors Vx and Vy are determined so as that the xy plane determined by the vectors Vx and Vy includes a tangent of the vector Cu in the new observation point T.

In a step S128, the display image generating part 105 generates drawing data based on the view data corresponding to the curved surface shape obtained from the view determining part 104. The display controlling part 106 displays a drawing corresponding to the new view on the display unit based on the drawing data generated by the display image generating part 105.

In a step S129, it is determined whether or not it is an end of the process. When it is determined that it is the end of the process, the process goes back to the step S121 to receive a next input instruction of the user.

In the above-described embodiment, the observation point movement path calculating part 109 along the target surface prepared for each shape type of each target surface may be provided. And the view determining part 104 may select the movement path calculating part corresponding to the type of corresponding target surface, based on the information object that is obtained from the information object data storing part 102 and becomes as a reference of the view movement displayed at the display unit.

Figure 10:
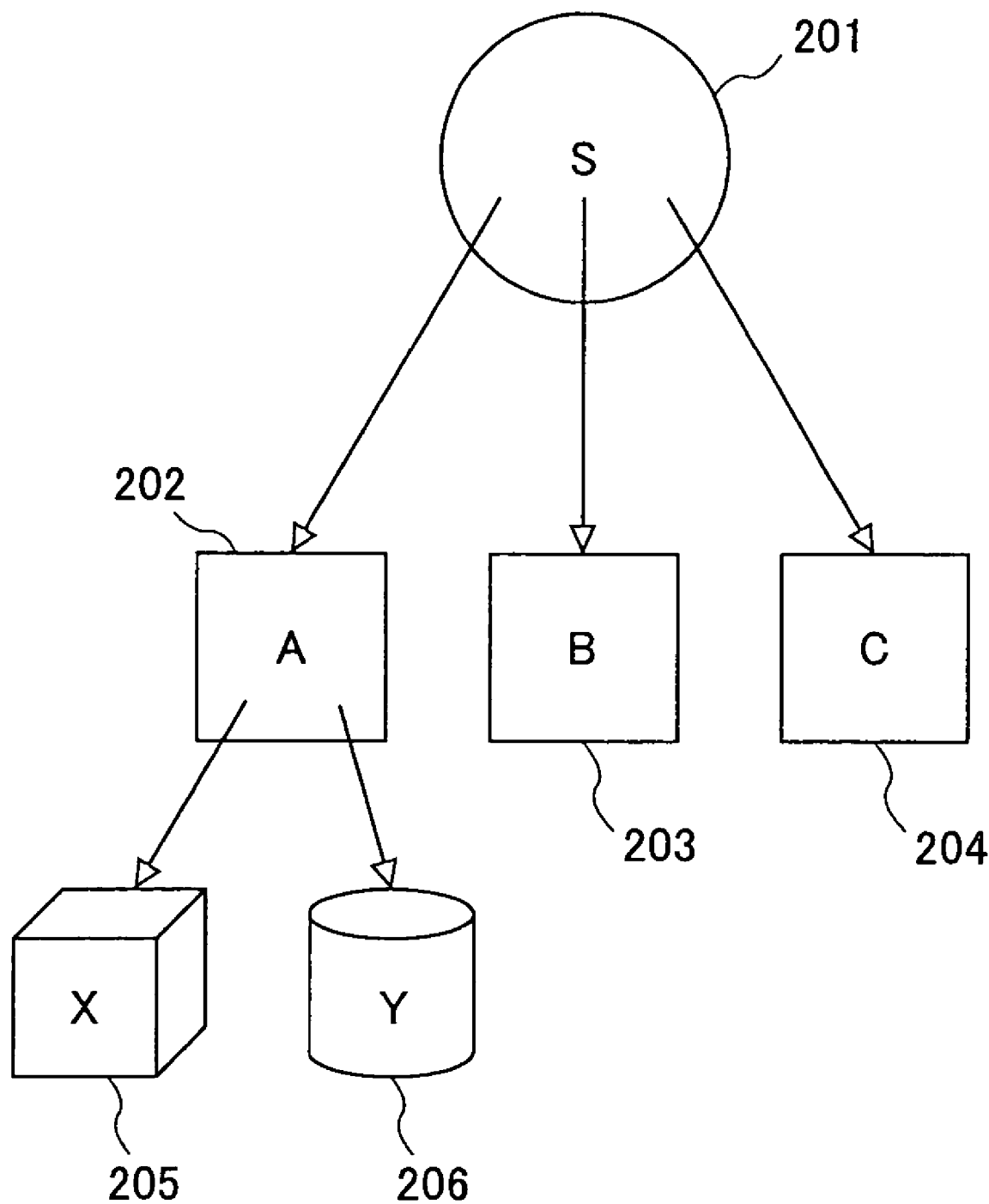
FIG. 10 is a diagram showing an example of a successive link of the information objects.

Next, for example, an example of an operation realized by the above-described processes in a case in which the information objects successively linking each other and having different shapes as shown in FIG. 10 are moved upward, downward, rightward, or leftward will be described.

FIG. 10 is a diagram showing an example of a successive link of the information objects.

Referring to FIG. 10, an information object S 201 having a spherical surface links to an information object A 202, an information object B 203, and an information object C 204 having a plane. And the information object A 202 is linked to information objects X 205 and Y 206 being cubic. In FIG. 10, a starting point side of each arrow indicates the information object being a link source and an ending point side of each arrow indicates the information object being a link destination.

In the information objects successively linking each other, for example, the information object of the link destination in each link is arranged on a smaller scale than that of the information object of the link source near the surface of the information object of the link source.

That is, the information objects A 202, B 203, and C 204 being plane as the information object of the link destination are arranged on a small scale near the surface of the information object S 201 having the spherical surface as the information object of the link source. Furthermore, the information object X 205 being cubic and the information object Y 206 being cubic as a link destination information object are arranged on a small scale near the surface of the information object A 202 being plane as the information object of the link source.

In definition of the information object of the link destination with respect to the information object of the link source, the local coordinate system is defined for each of the information objects. Then, the local coordinate system can be defined by defining the transformation matrix between those coordinate systems.

For example, regarding the information object S 201 having a spherical surface shape, a local coordinate system which center is an origin is defined. Regarding information object A 202 having the plane shape, which is linked from the information object S 201, a local coordinate system which center is an origin and the plane shape corresponds to the xy plane is defined. In contrast with the former local coordinate system, as for the origin of the latter local coordinate system, the origin comes near the sphere surface and a direction of the z axis is arranged so as to point the origin of the latter local coordinate system. This definition is defined by the transformation matrix between both coordinate systems.

Next, screen changes by the view movement for the information object successively linked as shown in FIG. 10 will be described with reference to FIG. 11.

Figure 11:
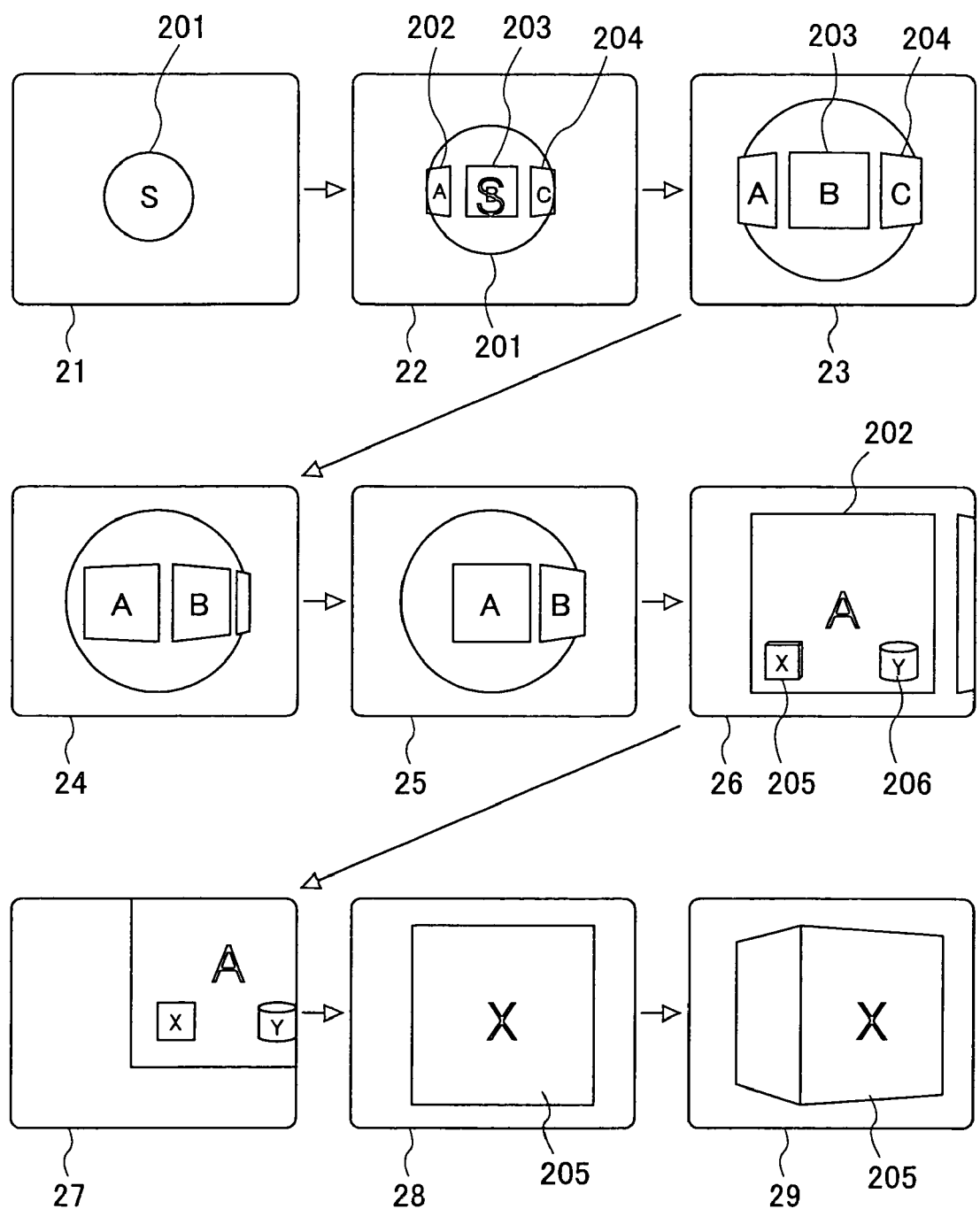
FIG. 11 is a diagram showing an example of screen changes by the view movement.

FIG. 11 is a diagram showing an example of the screen changes by the view movement.

In FIG. 11, first, the information object S 201 having spherical surface is determined by an observation subject on a screen 21. And in a state in which the view is defined at a location of facing a front of and viewing from relatively far distance, the information objects in the virtual space are projected to be images. Since the information object S 201 is spherical, the viewpoint movement process shown in FIG. 9 is selected with respect to the viewpoint movement operation by the user.

In a state of the screen 21, when a movement to a front direction of the view is conducted by the view movement operation of the user, that is, the zoom-in operation is conducted, the information objects A 202, B 203, and C 204 having a plane shape and defined to link from the information object S 201, appear gradually while the information object S 201 displayed on the screen 22 becomes gradually larger as shown in a screen 22.

When the view movement operation is conducted to further move to the front direction of the view, the information objects A 202, B 203, and C 204 are clearly displayed as shown in a screen 23. As described above, in a sequence of information objects successively connected with links, the information objects to be displayed at a screen are automatically selected and displayed based on a location relationship between the view and each of the information objects. In addition, in a case in which the view approaches the information object gradually, the information object that has not been visible becomes opaque gradually, and appears on the screen.

Subsequently, when the view movement operation is conducted to move the view leftward, the information objects A 202, B 203, and C 204 move rightward so as to turn to a backside of the information object S 201 having the spherical surface. As shown in a screen 24, the information object C 204 turns and hides itself behind the information object S 201 having the spherical surface. Furthermore, by successively moving the view leftward, similarly, the information object B 203 turns behind the information object S 201 having the spherical surface, and then the information object A 202 is displayed at a front on the information object S 201 as shown in a screen 25. In this case, by the view movement operation to move the view leftward, the view is moved so as to turn beside the information object S 201 along a path such as a view movement path 412 shown in FIG. 4A.

In the screen 25, the information object A 202 becomes visible at the front. When the zoom-in operation is conducted from this state, as shown in the screen 26, the information object A 202 is displayed larger, and the information object X 205 and the information object Y 206 linked from the information object A 202 appear. In addition, the information object to be the observation subject is switched from the information object S 201 to the information object A 202. Thereby, the view movement method shown in FIG. 5 is selected.

Subsequently, when the view movement operation is conducted to move the view leftward or downward, the viewpoint moves to the viewpoint movement path 412 and 413 shown in FIG. 3A, and the information objects A 202, X 205, and Y 206 are displayed as shown in a screen 27. Moreover, Furthermore, when the zoom-in operation is conducted, the information object X 205 is greatly displayed as shown in a screen 28.

And simultaneously, the information object as the observation subject moves from the information object A 202 to the information object X 205. By switching the information object A 202 to the information object X, the view movement process shown in FIG. 8 is switched to another view movement process shown in FIG. 9.

In a screen 28, when the view movement operation is conducted to move the view leftward, the viewpoint moves to turn to a left side of the information object X 205 along the viewpoint movement path 412. Then, the information object X 205 is displayed as shown in a screen 29.

Figure 12A:
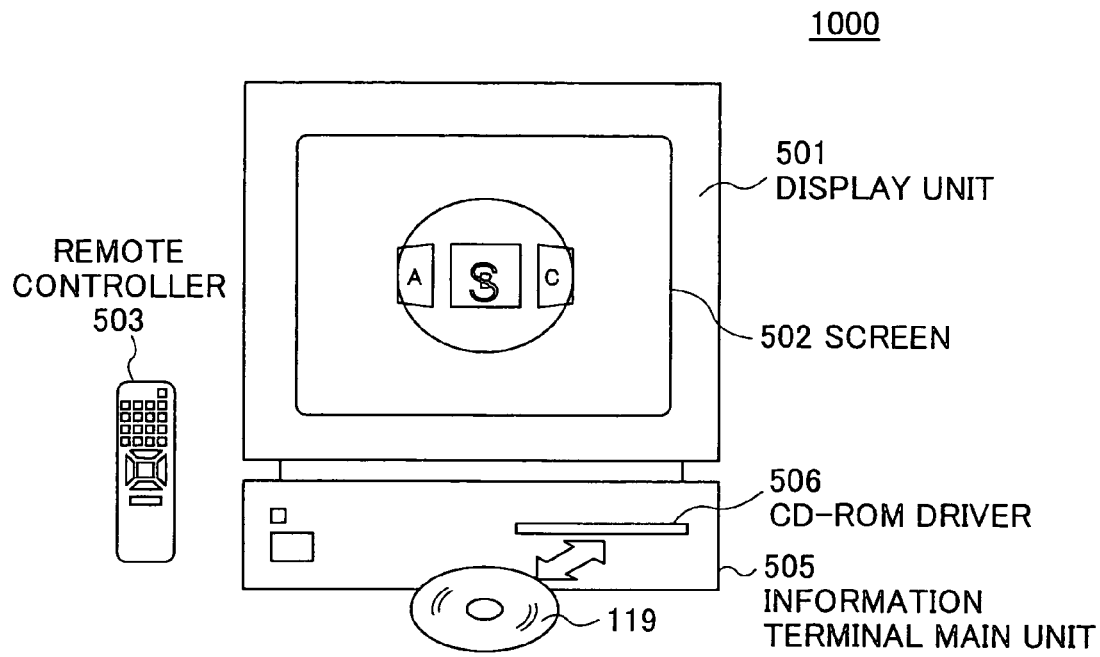
FIG. 12A is a diagram showing an example of an information terminal unit provided with the display controlling apparatus.
Figure 12B:
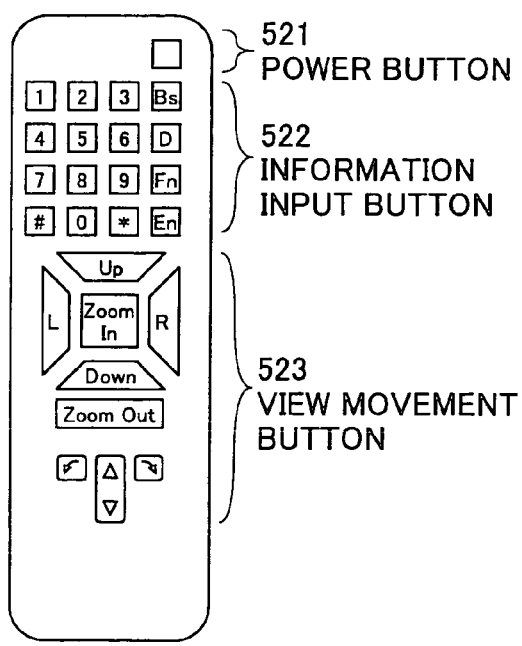
FIG. 12B and FIG. 12C are diagrams showing examples of remote controller for conducting a view movement operation.
Figure 12C:
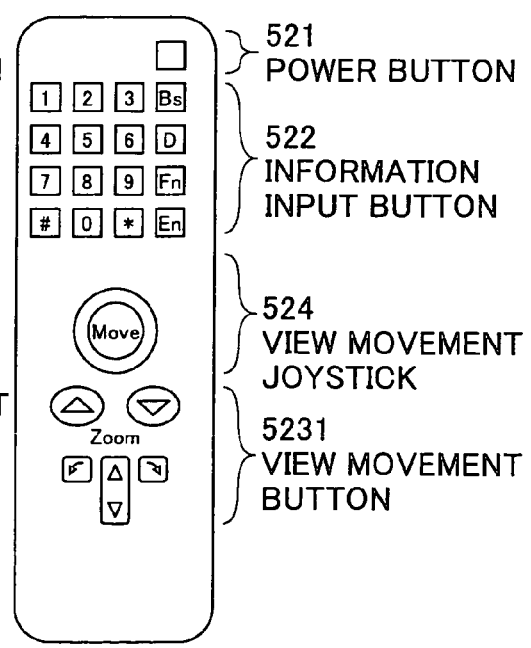
Figure 13:
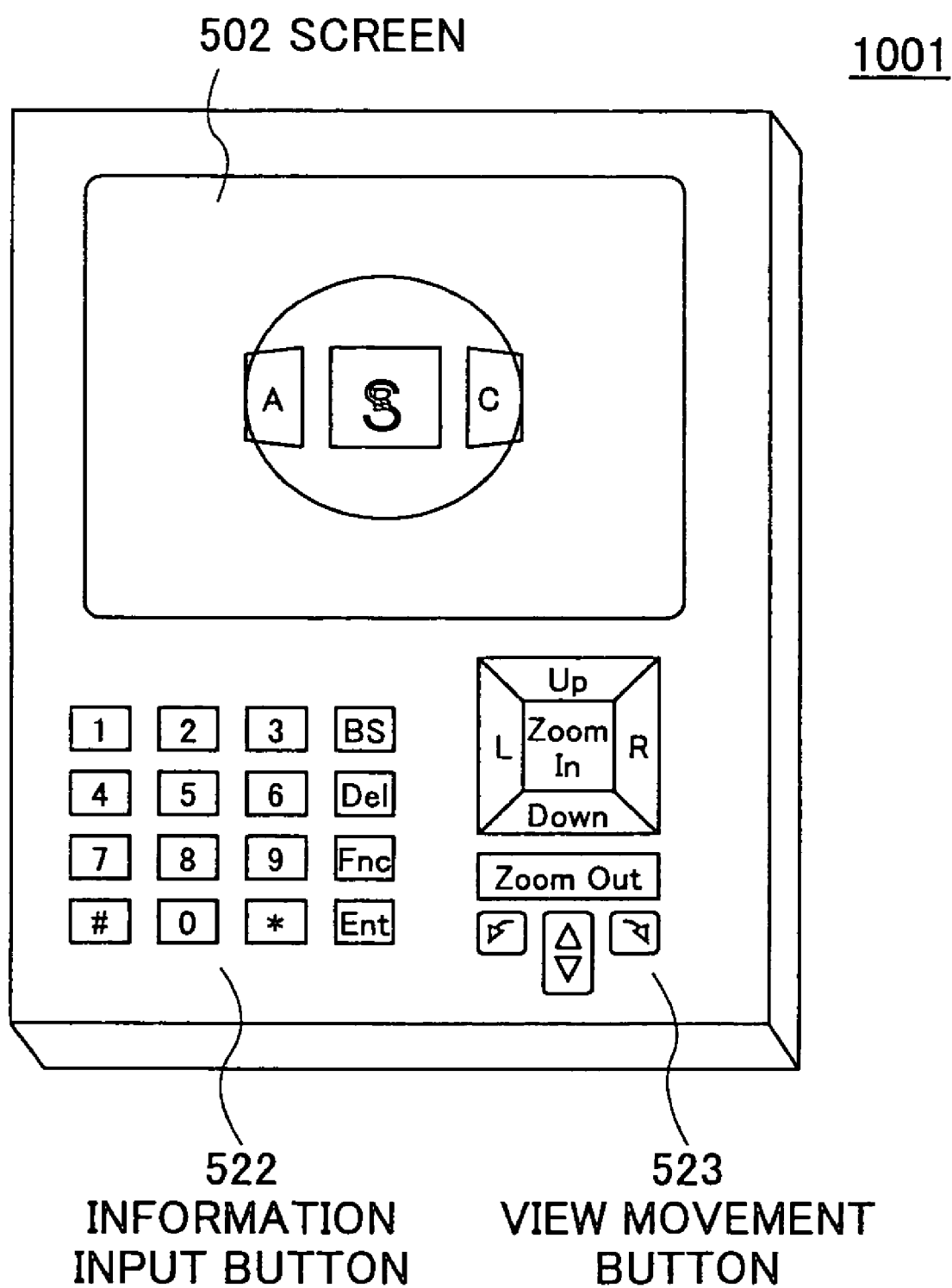
FIG. 13 is a diagram showing another example of the information terminal unit provided with the display controlling apparatus.

For example, an information terminal unit provided with the display controlling apparatus 100 realizing the above-described processes by a view movement operating device that enables a user to conduct the view movement operation can be configured as shown in FIG. 12 and FIG. 13.

FIG. 12A, FIG. 12B, and FIG. 12C are diagrams showing examples of the information terminal unit provided with the display controlling apparatus. An example is shown in that the user instruction receiving part 103 in FIG. 2 is applied to a remote controller.

In FIG. 12A, an information terminal unit 1000 includes a display unit 501 that displays display data on a screen 502 based on the display data sent from the display controlling part 106 in FIG. 2, a remote controller 503 that conducts the process by the user instruction receiving part 103 in FIG. 2, an information terminal main unit 505 that controls each of processing parts shown in FIG. 2 and controls the entire display unit 501, and a CD-ROM driver 506 that installs recorded data read from a CD-ROM 119 to a storage unit of the information terminal main unit 505.

The screen 502 of the display unit 501 consecutively changes with the view movement by the user operating the remote controller 503.

For example, the remote controller 503 that conducts the view movement operation is configured as shown in FIG. 12B and FIG. 12C.

Referring to FIG. 12B, the remote controller 503 includes a power button 521 that turns on or off a power source, an information input button 522 such as a ten key, and a view movement buttons 523 that indicates the view movement.

In the example shown in FIG. 12B, by pressing an L button to indicate leftward and an R button to indicate rightward of the view movement buttons 523, the processes with respect to the viewpoint movement path 412 shown in FIG. 3 and FIG. 4 are conducted by the view determining part 104.

Moreover, by pressing an Up button to indicate upward and a Down button to indicate downward of the view movement buttons 523, the processes with respect to the viewpoint movement path 413 shown in FIG. 3 and FIG. 4 are conducted by the view determining part 104.

Furthermore, by pressing a Zoom In button to indicate a zoom-in and a Zoom Out button to indicated a zoom-out of the view movement buttons 523, the processes with respect to the viewpoint movement path 411 shown in FIG. 3 and FIG. 4 are conducted by the view determining part 104.

Referring to FIG. 12C, the remote controller 503 includes the power button 521 that turns on or off the power source, the information input buttons 522 such as the ten key, a view movement joystick 524, and a view movement button 5231 that indicates the view movement.

In the example shown in FIG. 12C, the view movement joystick 524 can realize operations to go upward, downward, rightward, and leftward by the view movement buttons 523 shown in FIG. 12B. Moreover, the view movement button 5231 can realize the zoom-in, the zoom-out, the tilt, and the rotation operations.

FIG. 13 is a diagram showing another example of the information terminal unit provided with the display controlling apparatus. In this example, an information terminal unit being portable type is applied.

Referring to FIG. 13, similar to the information terminal unit 1000, an information terminal unit 1001 includes the screen 502 displaying the display data controlled by the display controlling part 106 in FIG. 2, and the information input buttons 522 and the view movement buttons 523 that have functions equivalent to those of the information terminal unit 1000.

In the above-described embodiment, according to the present invention, the view movement method is automatically selected corresponding to a form and contents of the information object that is the observation subject for a current view, from a plurality of the view movement processes described above, so that it is possible to conduct the view movement process based on the user instruction. Accordingly, even if the information object being plane and the information object being solid are mixed in a single space, the user is not required to be aware of differences and the user can browse the information objects by smoothly moving the view with a common operation.

Relative location relationships and scale ratios in the virtual space are stored and managed in the information object data storing part 102, as link information that defines correlation between the information objects. The information object to observe is automatically selected by the view determining part 104. And by the display image generating part 105, the information objects to display in the view determined are automatically selected and then display images are generated. Therefore, it becomes possible to realize changes of the view in response to the view movement instruction by the user.

Moreover, based on the link information, the zoom-in and the zoom-out can be infinitely repeated while sequentially tracing the information objects successively linked together.

Therefore, the user can search for an object by intuitive operations without clicking a mouse or a like.

A program that displays data showing three-dimensional shape on a two-dimensional screen generally determines a viewpoint location, a visual line direction, a view angle, and a like in a virtual three-dimensional space where three-dimensional shape data are arranged as the information object. And the program projects and displays the information object on the two-dimensional plane based on the viewpoint location, the visual line direction, the view angle, and the like. Since this viewpoint location, the visual line direction, and the like are changed by input from the user, a user interface can be realized so that the user can browse and operate the three-dimensional information objects from various locations or directions.

Moreover, as a method for displaying data, there is a zooming method for displaying a display object by enlarging or reducing the display object in the two-dimensional plane. The zooming method is to provide a uniform user interface with respect to the entire data image and a fine structure of each part by enlarging and reducing two-dimensional data subject to display. Especially, this is an effective display interface when data subject to display has a hierarchical structure.

In the zooming method, two ways for a movement speed when a display object is moved upward, downward, rightward, and leftward. One way is to define a change amount of a screen per unit time. This way determines how much time is needed, for example, when the display object displayed at a center of the screen is moved toward a side of the screen. In a user interface using a zoom, the change amount of the screen is generally constant, regardless of a ratio of enlargement and reduction by the zoom.

Another movement speed by the zoom is a relative velocity with respect to the display object, and shows a movement amount per unit time with respect to the display object displayed on the screen. In a case in which the change amount of the screen is constant, the relative velocity becomes greater while viewing the entire image, and the relative velocity becomes smaller while viewing details. The enlargement and reduction by the zoom with respect to the two-dimensional plane are considered as movements of approaching toward and departing from the two-dimensional plane being in the three-dimensional space. In this case, the relative velocity with respect to the display object by the zoom becomes an absolute velocity in the three-dimensional space and can be shown as changed corresponding a distance between the two-dimensional plane in the three-dimensional space and the viewpoint location.

On the other hand, in the above-mentioned user interface for displaying the three-dimensional information object, the movement speed is constant at the viewpoint location in many cases. If the movement speed is constant at the viewpoint location, in a case in which the viewpoint location is located far from the three-dimensional information object and the view movement operation is conducted broadly, the movement speed is felt slower than expected. In a case in which the viewpoint location is located closer the three-dimensional information object and the view movement operation is conducted for a detailed portion, the movement speed is felt faster than expected. Thus, a problem causes so that the user cannot conduct the fine operations for the detailed portion.

Accordingly, a distance between a location where the three-dimensional information object exists and the viewpoint location is calculated, and the movement speed is changed corresponding to the distance. Therefore, it is possible to realize the movement by a proper movement speed at the viewpoint location to view and operate with respect to the entire image and the detailed portion. This is a similar method in which the two-dimensional plane is shown in a three-dimension by the zoom.

This control of the movement speed corresponding to the distance can be enough for a case in which there is only one three-dimensional information object subject to display. However, when there is a plurality of three-dimensional information objects, there are many distances as requirements for the speed control between the viewpoint location and the plurality of three-dimensional information objects. Accordingly, the movement speed of the viewpoint at a certain location cannot be uniquely determined.

In order to overcome the above-described problem, it is required to determine one movement speed based on each of distances between the viewpoint location and the plurality of three-dimensional information objects.

Thus, the nearest information object to the viewpoint location is selected from the plurality of three-dimensional information objects, and the movement speed of the viewpoint is determined by the distance between the selected three-dimensional information object and the viewpoint location. The nearest information object is set as a reference information object. The movement speed is decelerated when the viewpoint location is getting closer to the reference information object, and the movement speed is accelerated when the viewpoint location is getting farther from the reference information object. When another three-dimensional information object becomes closer to the viewpoint location than a current reference information object during the view movement, the three-dimensional information object is set as the reference information object. Then, the movement speed of the view is changed based on the distance from the viewpoint location to the three-dimensional information object. Hereinafter, information which each of the three-dimensional information objects to calculate this distance is called a "geometric model" of each three-dimension information object". For example, if each of the three-dimensional information objects has information showing a plane as the geometric model, the distance with respect to the plane is calculated. If each of the three-dimensional information objects has information showing a spherical surface as the geometric model, first, the distance from the viewpoint location to a center of the sphere is calculated, and then, a value deducted a radius of the sphere from its result is set as the distance.

A case of the view movement approaching toward the plane and a case of the view movement approaching toward the sphere are compared. In the case of the movement approaching toward the plane, when the view is moved toward the plane in parallel, the view movement becomes a linear movement in the three-dimensional space. On the other hand, when the same linear movement is conducted to approach toward the spherical surface, the distance from the spherical surface is changed accompanying with the linear movement. In order to move along the spherical surface, a curvilinear movement is required. It is very difficult for the user to move along the spherical surface by repeating the linear movement. However, if various movement methods are provided simultaneously to the user, it becomes inconvenience for the user because an operation system becomes complicate. It may be required more in addition to the various movement methods, that is, further movement methods can be required with respect to the three-dimensional information objects. It is desired for the user to move the view by the same operation in a method corresponding the shape of the three-dimensional information object.

Accordingly, in the above-described "geometric model", in addition to the method for calculating a distance, information concerning the movement method with respect to the operation of the user is stored. When the viewpoint location is moved, a direction to move is obtained based on the geometric model, the movement speed is determined by the distance similarly obtained based on the geometric model, and then, the viewpoint location is moved. By this process, the viewpoint movement can be realized corresponding to each shape of the three-dimensional information objects.

In the following, a method to realize a process based on the above-described "geometric model" will be described with illustrating a three-dimensional data browsing apparatus that can be realized by a three-dimensional data browsing program.

Figure 14:
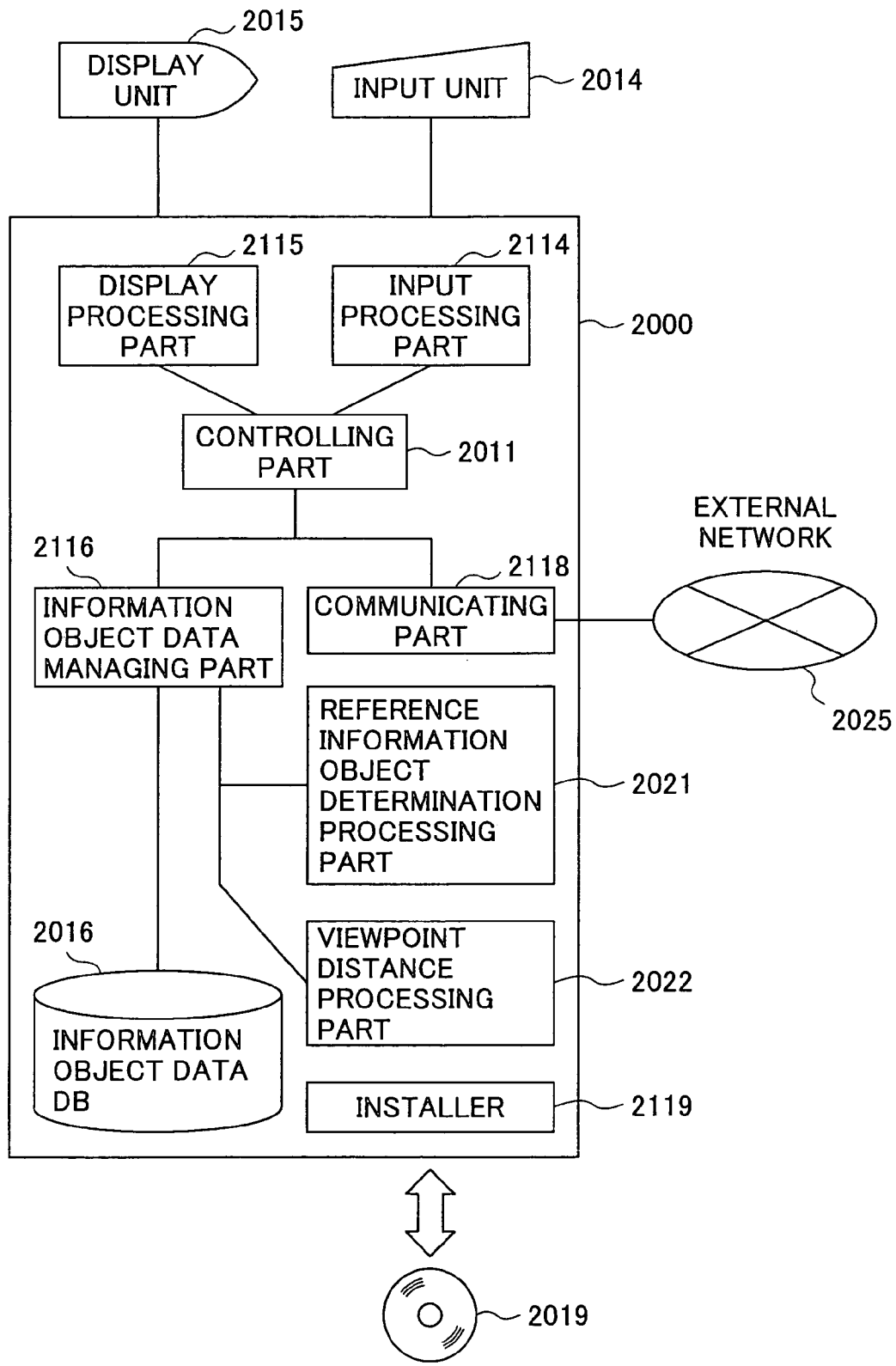
FIG. 14 is a diagram showing a configuration of a three-dimensional data browsing apparatus.

FIG. 14 is a diagram showing a configuration of the three-dimensional data browsing apparatus.

In FIG. 14, a three-dimensional data browsing apparatus 2000 includes a controlling part 2011 that controls the entire three-dimensional data browsing apparatus 2000, an input processing part 2114 that controls data input from an input unit 2014, a display processing part 2115 that displays data on a display unit 2015, an information object data managing part 2116 that manages information object data by an information object data DB 2016, a communicating part 2118 that controls data communication through an external network 2025, an installer 2019 that installs a three-dimensional data browsing program for realizing a browse by the three-dimensional data from CD-ROM 2019 that is a storage medium storing the three-dimensional data browsing program, a reference information object determination processing part 2021, and a viewpoint distance processing part 2022.

The controlling part 2011 is a CPU (central processing unit) of the three-dimensional data browsing apparatus 2000, and controls the entire apparatus 2000.

The input unit 2014 includes the remote controller 503 shown in FIG. 12B or FIG. 12C, and controls to input data according to the operations of the user.

The reference information object determination processing part 2021 determines the information object used as a reference information object by comparing distances between the viewpoint location and the plurality of the information objects. Moreover, the reference information object determination processing part 2021 can determine the movement direction and the movement speed of the viewpoint upward, downward, right ward, or leftward, based on geometric model information of the determined reference information object that is managed in the information object data managing part 2116 by the information object data DB 2016.

The viewpoint distance processing part 2022 processes the distance from the viewpoint location based on the local coordinate system shown using the geometric model information for each information object that is managed in the information object data managing part 2116 by the information object data DB 2016. Thereby, the reference information object determination processing part 2021 can compare the distances from the viewpoint location to the information objects having different geometric model information, and can properly determine the reference information object.

Figure 15:
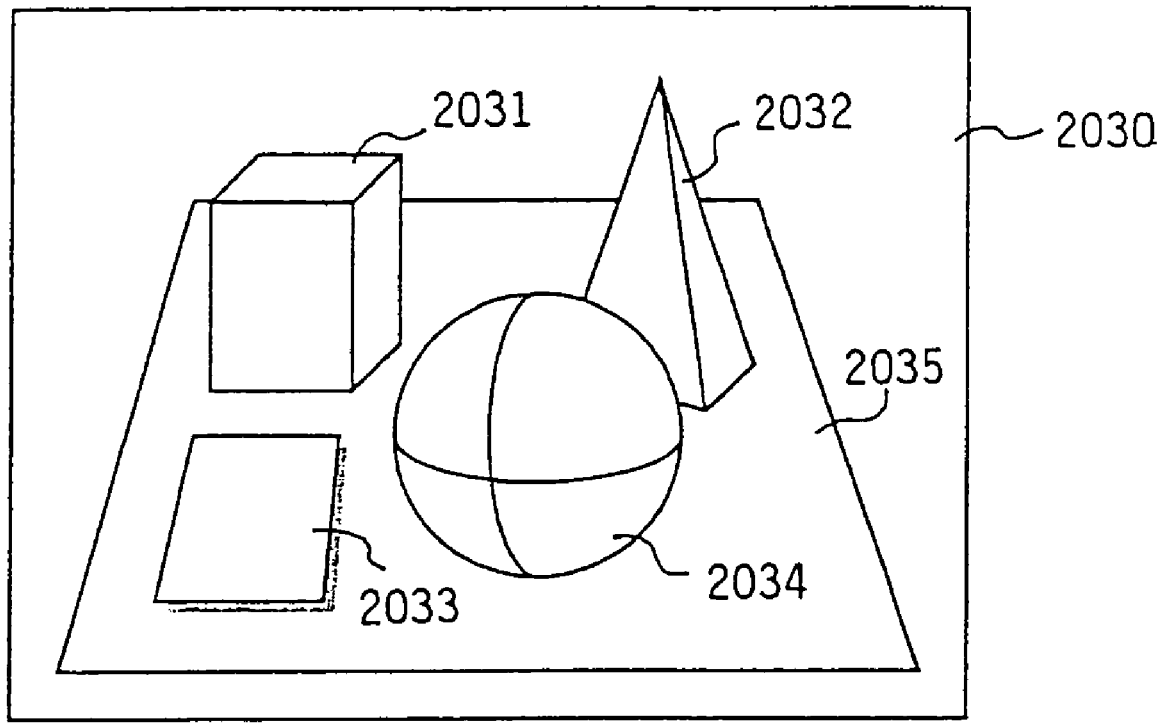
FIG. 15 is a diagram showing a display example of the three-dimensional data browsing screen.

FIG. 15 is a diagram showing a display example of the three-dimensional data browsing screen.

In FIG. 15, the three-dimensional data browsing screen, which is displayed at the display unit 2015 by the three-dimensional data browsing program installed by the installer 2019, is illustrated. The three-dimensional data browsing screen 2030 is the display example in that the information objects 2031 through 2035 arranged in the virtual three-dimensional space are displayed at the display unit 2015 by projecting to the two-dimensional plane based on information concerning the viewpoint set in the three-dimensional space. The viewpoint can be moved to various directions by an instruction input by the user.

In a case of approaching the viewpoint from a state in FIG. 15 to an information object 2034 being a sphere in a screen, aspects of changes of the three-dimensional data browsing screen 2030 is shown in FIG. 16A through FIG. 16D.

FIG. 16A through FIG. 16D are diagrams showing examples of changes of the three-dimensional data browsing screen in the case of approaching the viewpoint to the information object.

Figure 16A:
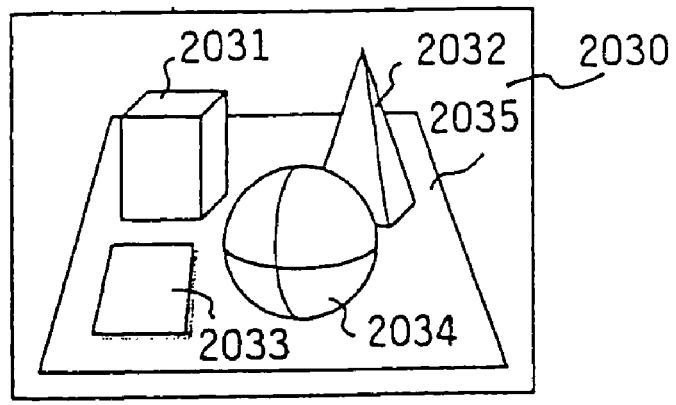
FIG. 16A through FIG. 16D are diagrams showing examples of changes of a three-dimensional data browsing screen in a case of approaching the viewpoint to the information object.
Figure 16B:
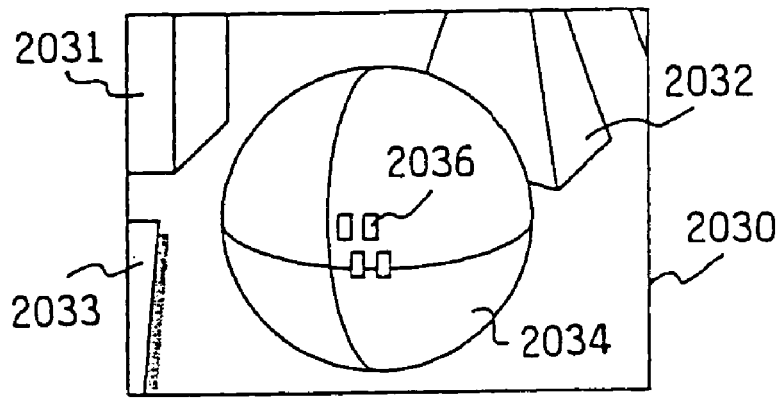
Figure 16C:
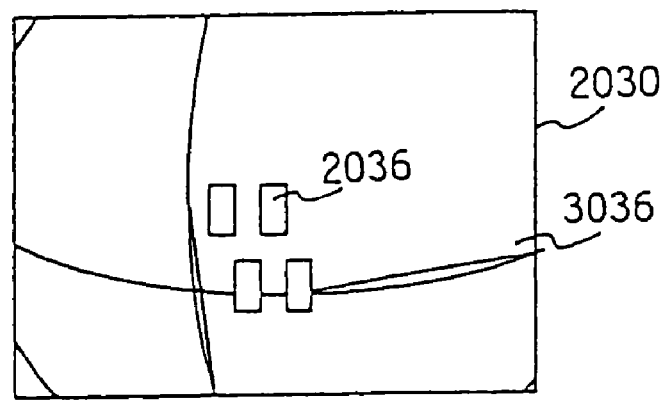
Figure 16D:
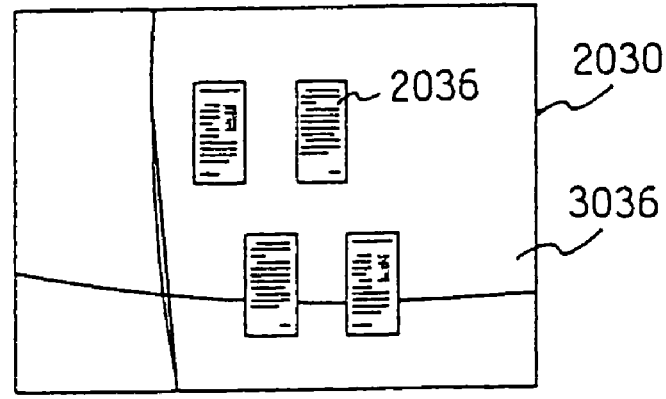

In FIG. 16A showing information showing the entire information objects 2031 through 2035 on the three-dimensional data browsing screen 2030, when the viewpoint approaches along the information object 2034 being the sphere, the information object 2034 being the sphere is enlarged so that information 2036 becomes visible. Simultaneously, the information objects 2031 through 2033 are changed so as to disappear out the three-dimensional data browsing screen 2030. Furthermore, when the viewpoint focuses on and approaches the information 2036 of the information object 2034 being the sphere, the information 2036 is displayed at the center of the three-dimensional data browsing screen 2030, enlarged while the information object 2034 being the sphere, and then, the information 2036 and the information object 2034 being the sphere are displayed in the entire screen as shown in FIG. 16C. When the viewpoint further approaches toward the information 2036, the information 2036 is enlarged as shown in FIG. 16D, so as to see what the information 2036 looks like.

In this three-dimensional data browsing apparatus 2000, data of each information object subject to display are stored in the information object data DB 2016 by the information object data managing part 2116 beforehand, or are stored in the information object data DB 2016 by obtaining through the external network 2025 connected to the three-dimensional data browsing apparatus 2000 if necessary.

Figure 17:
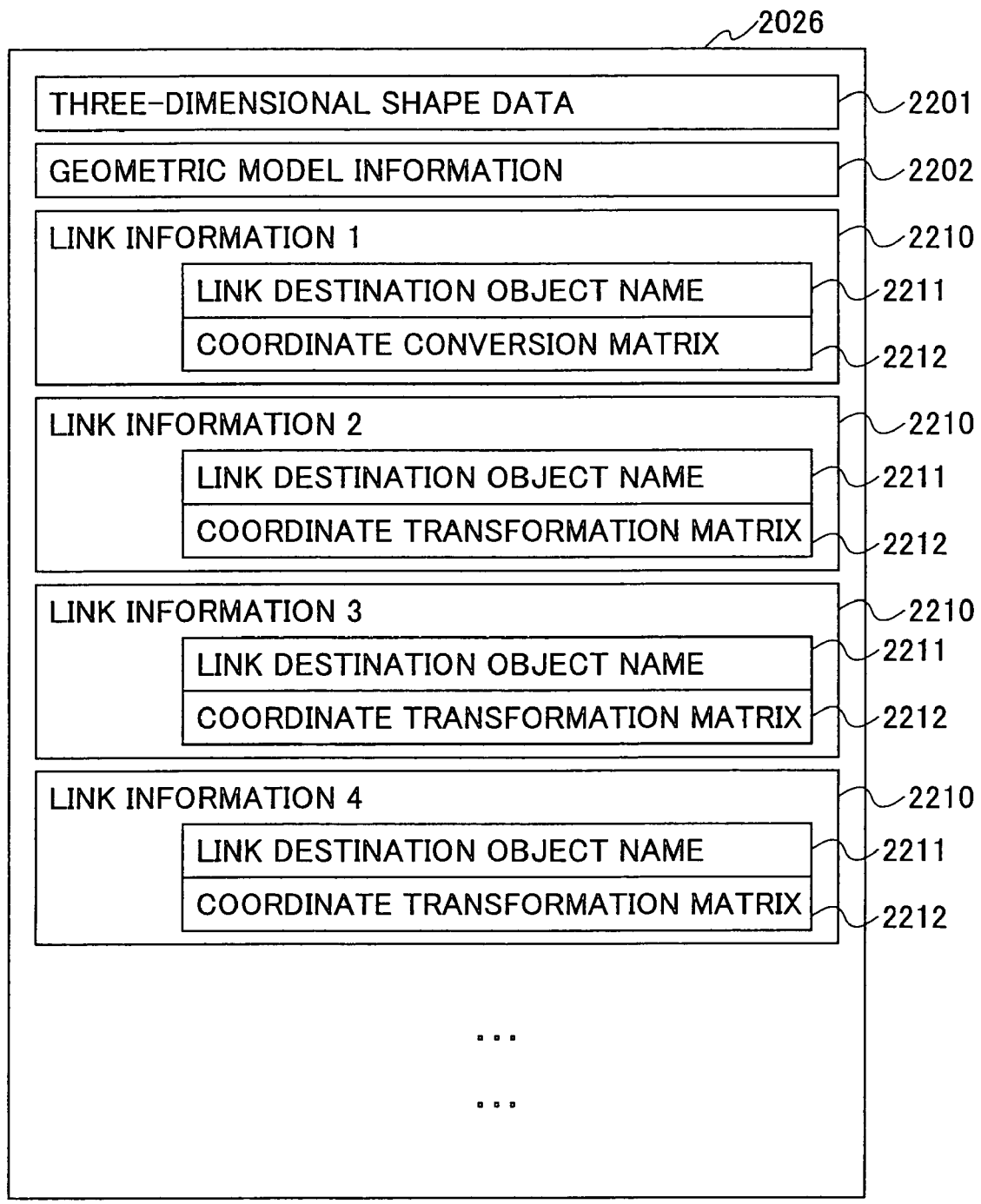
FIG. 17 is a diagram showing a link structure of each of the information objects.

For example, the information belonging to each of the information objects 2031 through 2035 includes a link structure as shown in FIG. 17.

FIG. 17 is a diagram showing the link structure of each of the information objects.

Referring to FIG. 17, the link structure 2026 is managed by the information object data DB 2016 in FIG. 14, and includes a three-dimensional shape data 2201 that specify a three-dimensional shape, a geometric model information 2202 that shows geometric information required to calculate the distance from the viewpoint location to the information object, and a link information 2210 that shows information concerning the information object to be linked. The link information 2210 includes a link destination information object name 2211 that shows a information object name used as a link destination, and a coordinate transformation matrix 2212 that transforms from the local coordinate system for the link source information object to the local coordinate system of the link destination information object. For example, the local coordinate system can be determined by a size of the information object and the geometric model information 2202 showing a geometric shape.

In the geometric model information 2202, a direction and endpoints of a plane are recorded if the information object is the plane, and a location of a center and a radius length of a sphere are recorded if the information object is the sphere.

The geometric model information 2202 is referred to when the viewpoint is moved by operating the input unit 2014 by the user.

In FIG. 17, each of the information objects subject to display in the three-dimensional data browsing apparatus 2000 includes the local coordinate system. In the local coordinate system, vertexes, lines, and a surface are defined so as to define a geometric three-dimensional shape. Moreover, each of the information objects includes other information objects by a link structure 2026 by which all the information objects form a tree structure. Hereinafter, the link destination information object is called a child information object of the link source information object, and the link source information object is called a parent information object with respect to the link destination information object. All the information objects except for the information object positioned as an origin of this tree have only one parent information object. Moreover, for each child information object, the parent information object has geometric relationships such as a location and a size in the three-dimensional space, as the coordinate transformation matrix for transforming from the local coordinates of the parent information object to the local coordinates of the child information object. Also, data of the child information object defines a three-dimensional model in the local coordinate system of the child information object itself, and includes link information to further link another child information object.

A displaying process in the three-dimensional data browsing apparatus 2000 will be described with reference to FIG. 16A through FIG. 16D.

Figure 18:
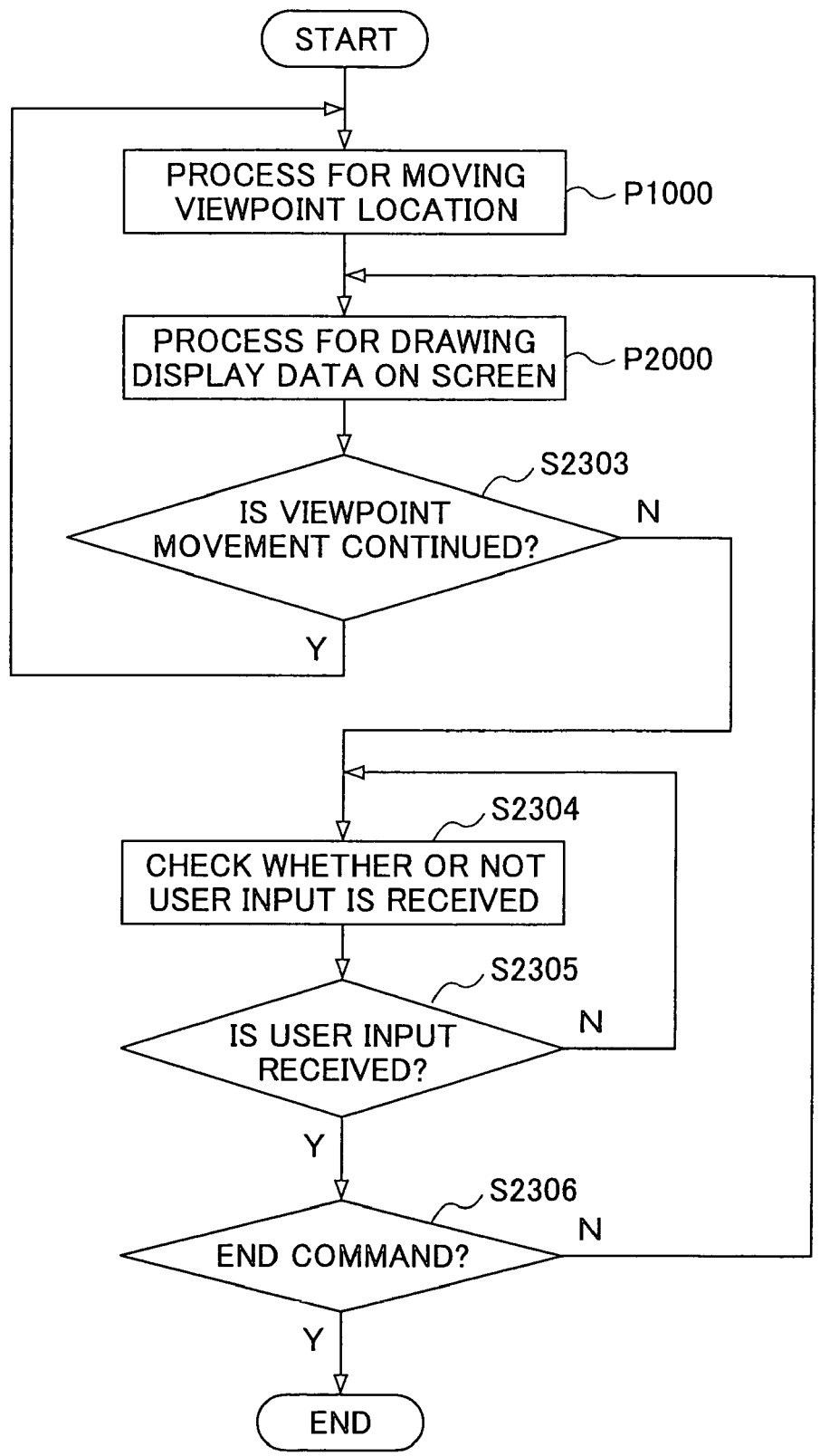
FIG. 18 is a flowchart diagram for explaining a displaying process in the three-dimensional data browsing apparatus.

FIG. 18 is a flowchart diagram for explaining the displaying process in the three-dimensional data browsing apparatus.

In FIG. 18, the controlling part 2011 conducts a process P1000 for moving the viewpoint location. For example, this process P1000 corresponds to a process conducted by the view movement calculating parts 107 and the observation point movement path calculating part 109, and calculates the movement distance corresponding to the shape of the information object.

Next, the controlling part 2011 conducts a process P2000 for drawing the display data on a screen. This process P2000 determines the information object as the reference information object based on the movement distance of the viewpoint calculated in the process P1000, and draws on the display unit 2015.

Subsequently, it is determined whether or not the viewpoint movement is continuing (step S2303). When the viewpoint movement has been conducted, the displaying process goes back to the process P1000 and the same process is conducted.

On the other hand, the viewpoint movement is not continuing, it is checked whether or not a user input is received (step S2305). When no user input is received, the displaying process goes back to the step S2304, and conducts the same process again.

On the other hand, when the user input is received, it is determined whether or not user input is an end command (step S2306). When the user input is the end command, the displaying process in the three-dimensional data browsing apparatus 2000 is terminated. When the user input is not the end command, the displaying process goes back to the process P2000, and the same process is conducted.

For example, in FIG. 16A, by the above-described display process, when the user moves the viewpoint so as to have the viewpoint approached toward the information object 2034 being the sphere, the process P2000 determines the information object 2034 being the sphere as the reference information object. Moreover, in this case, four sets of link information 2210 are obtained by referring to the link structure 2026 of the information object 2034 being the sphere, and based on the coordinate transformation matrix 2212, four information objects 2036 are displayed on the information object 2034 being the sphere on the three-dimensional data browsing screen 2030 (FIG. 16B). After that, by setting the information object 2034 being the sphere as the reference information object, as shown on the three-dimensional data browsing screen 2030 shown in FIG. 16C and FIG. 16D, four children information objects linked from the information object 2034 being the sphere can be visually recognized.

In this embodiment, when the viewpoint is moved, the display data is changed corresponding to the distance from the viewpoint to the nearest information object in the three-dimensional space. In this embodiment, the movement speed of the viewpoint is proportional to the distance from the nearest information object.

Figure 19:
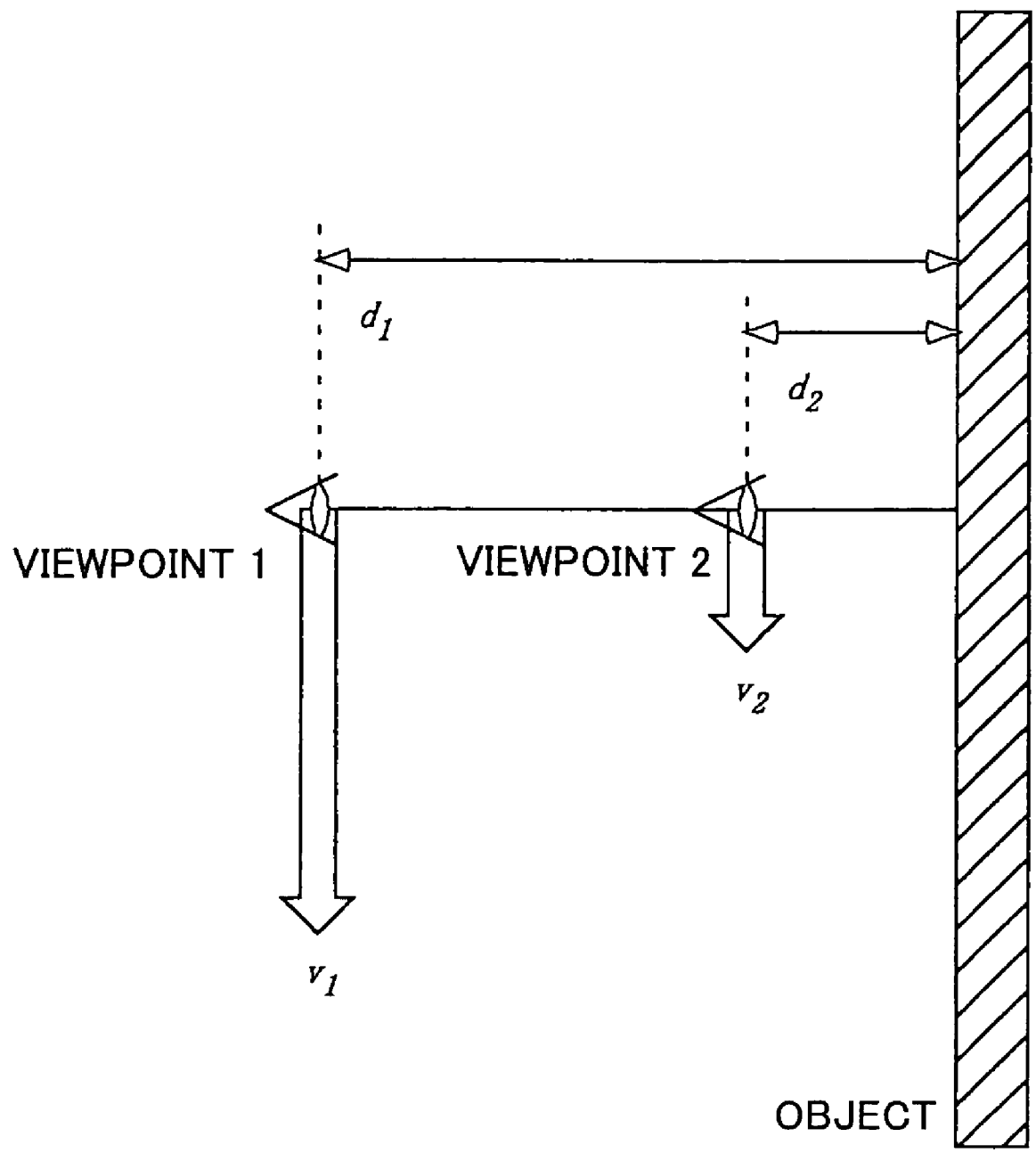
FIG. 19 is a diagram showing an example of a movement speed of the viewpoint corresponding to a viewpoint location.

FIG. 19 is a diagram showing an example of the movement speed of the viewpoint corresponding to the viewpoint location.

In FIG. 19, it is assumed that when a distance from a viewpoint 1 to the information object is d1, the movement speed to move the viewpoint 1 is v1. After that, when a location of the viewpoint 1 moves to the viewpoint 2 and a distance from the viewpoint 2 the information object becomes d2, the movement speed of the viewpoint 2 becomes v2. Since the movement speed is proportional to the distance toward the information object, a relationship between these values is shown as follows:

$$v2=(d2/d1)v1$$

Thus, when the movement speed in a certain reference distance d0 is set to v0, a movement speed v when the distance from the nearest information object is shown as follows:

$$v=(d/d0)v0$$

Figure 20:
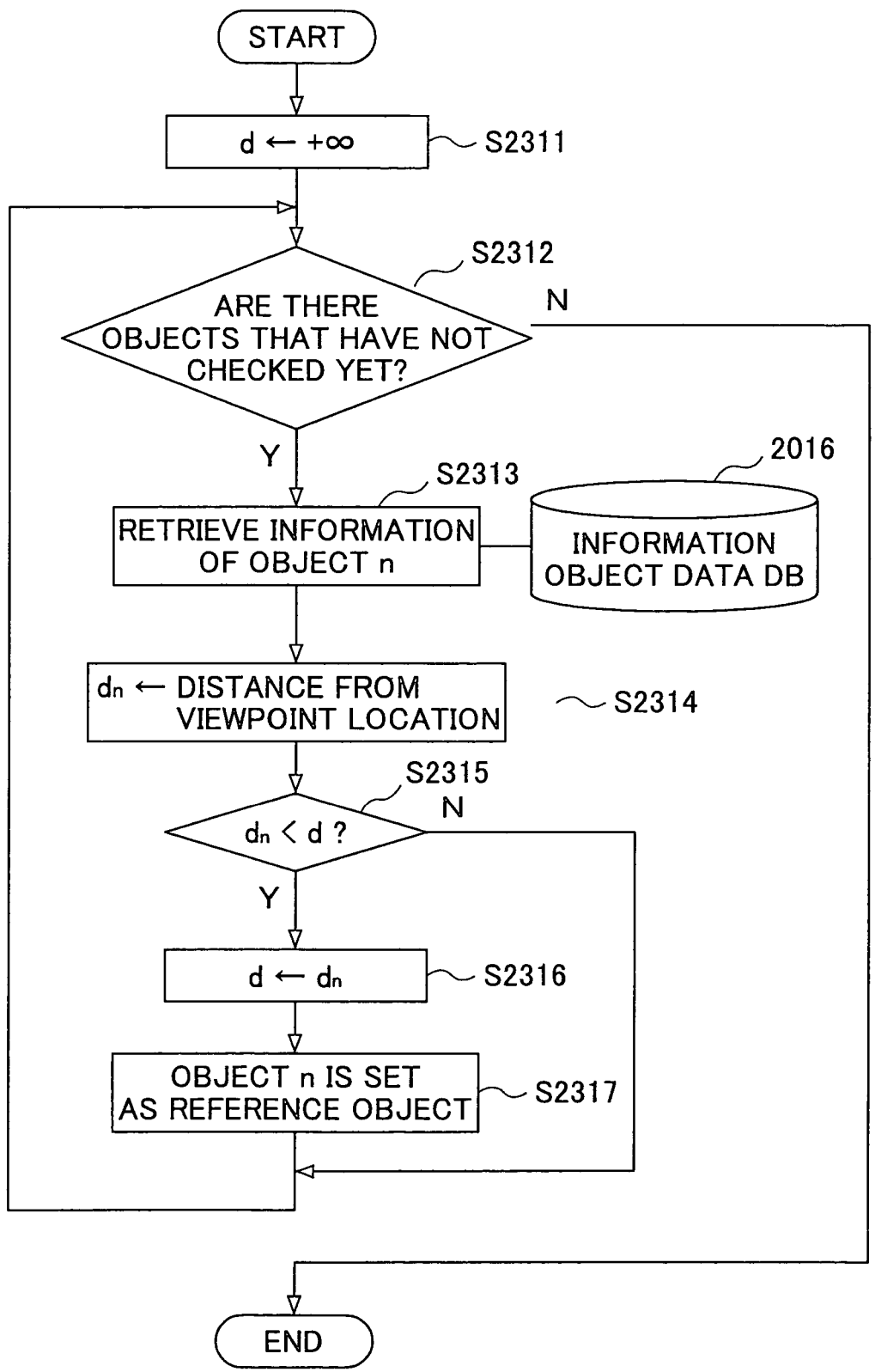
FIG. 20 is a flowchart diagram for explaining a reference information object determining process.

A process for obtaining the nearest information object is conducted in accordance with a flowchart shown in FIG. 20. The reference information object determination processing part 2021 in FIG. 14 obtains distances from the viewpoint location to all information objects, and a reference information object determining process for determining the information object having the smallest value of the distance as reference information object is executed.

FIG. 20 is a flowchart diagram for explaining the reference information object determining process.

In FIG. 20, the reference information object determining process sets infinity to a value d (step S2311). It is determined whether or not there are any information objects that have not been checked (step S2312). When all the information objects are checked, the reference information object determining process is terminated.

On the other hand, when there are some information objects that have not been checked, information of information object n is retrieved from the information object data DB 2016 (step S2313). The distance dn from the viewpoint location to the information object n is set based on the information of information object n retrieved the information object data DB 2016 (step S2314), and it is determined whether or not the distance dn from the viewpoint location to the information object n is less than the value d (step S2315). When the distance dn from the viewpoint location to the information object n is greater than or equal to the value d. The reference information object determining process goes back to the step S2312 and the same process is conducted.

On the other hand, the distance dn from the viewpoint location to the information object n is less than the value d, the information object n is set as the reference information object (step S2317). The reference information object determining process goes back to the step S2312 and the same process is conducted.

The movement speed is changed based on the distance obtained by the process conducted by the reference information object determination processing part 2021.

By changing the movement speed based on the distance, it is possible to realize a proper movement speed corresponding to the size of the information object in the screen. For example, in a state of the screen in FIG. 16A, in a case in which the movement speed is proper to the operation moving the viewpoint so that the sphere is positioned at the center of the screen or so that a rectangular solid is positioned at the center of the screen, if the movement speed of the viewpoint is constant regardless of the distance to the information object, the movement speed is too fast to move the viewpoint so that each of the children information objects on the sphere is positioned at the center of the screen in a state of the screen in FIG. 16D. Consequently, it is difficult for the user to browse each of the children information objects. Moreover, if the movement speed used between the children information objects on the screen in FIG. 16D is applied to all movements, the movement between the information objects on the screen in FIG. 16A takes too much time. On the contrary, if the movement speed is changed corresponding the distance, the movement speed is changed corresponding to the distance from the nearest information object being the sphere while changing a screen state in FIG. 16A to another screen state in FIG. 16D. Accordingly, it is possible to realize the proper movement speed corresponding to each screen state. This nearest information object is the "reference information object". In this case, the direction of the viewpoint movement corresponds to the viewpoint movement along this shape of the reference information object. When the viewpoint location becomes closer to another information object than the reference information object, another information object is newly used as a new reference information object.

The information object subject to browse at the three-dimensional browsing apparatus 2000 shows various shapes in the three-dimensional space.

In a case in which the information object being plane is the reference information object, the direction of the viewpoint movement when the user operates the viewpoint to move upward or downward by using the input unit 2014 will be described with reference to FIG. 21.

Figure 21:
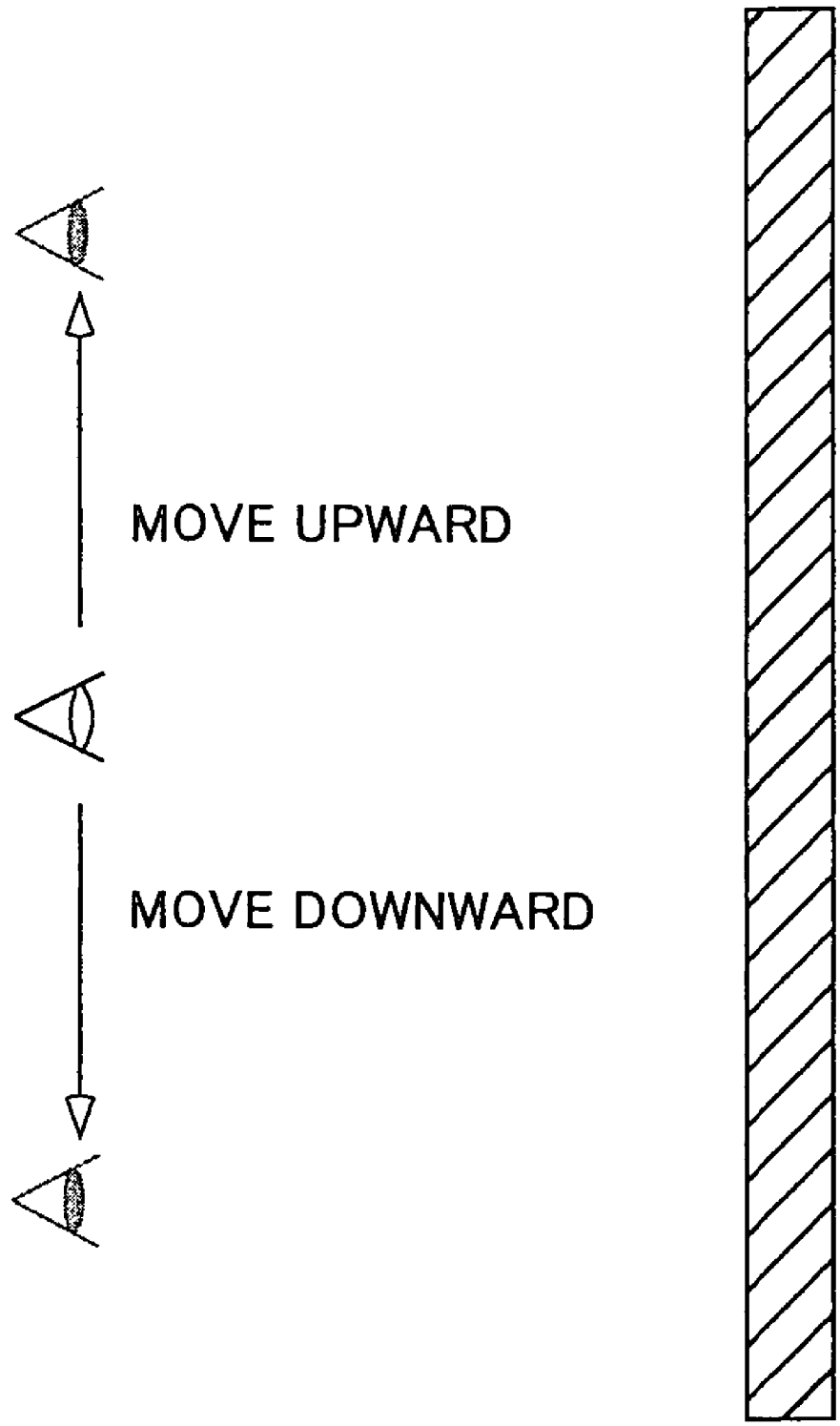
FIG. 21 is a diagram showing a direction example of the viewpoint movement in a case in which the information object being plane is the reference information object.

FIG. 21 is a diagram showing a direction example of the viewpoint movement in a case in which the information object being plane is the reference information object.

In FIG. 21, when the viewpoint location is moved upward or downward by the user operating the input unit 2014 with reference to the reference information object being plane, the viewpoint location is moved in parallel to the plane.

In a case in which the information object being spherical is the reference information object, the direction of the viewpoint movement when the user operates the viewpoint to move upward or downward by using the input unit 2014 will be described with reference to FIG. 22.

Figure 22:
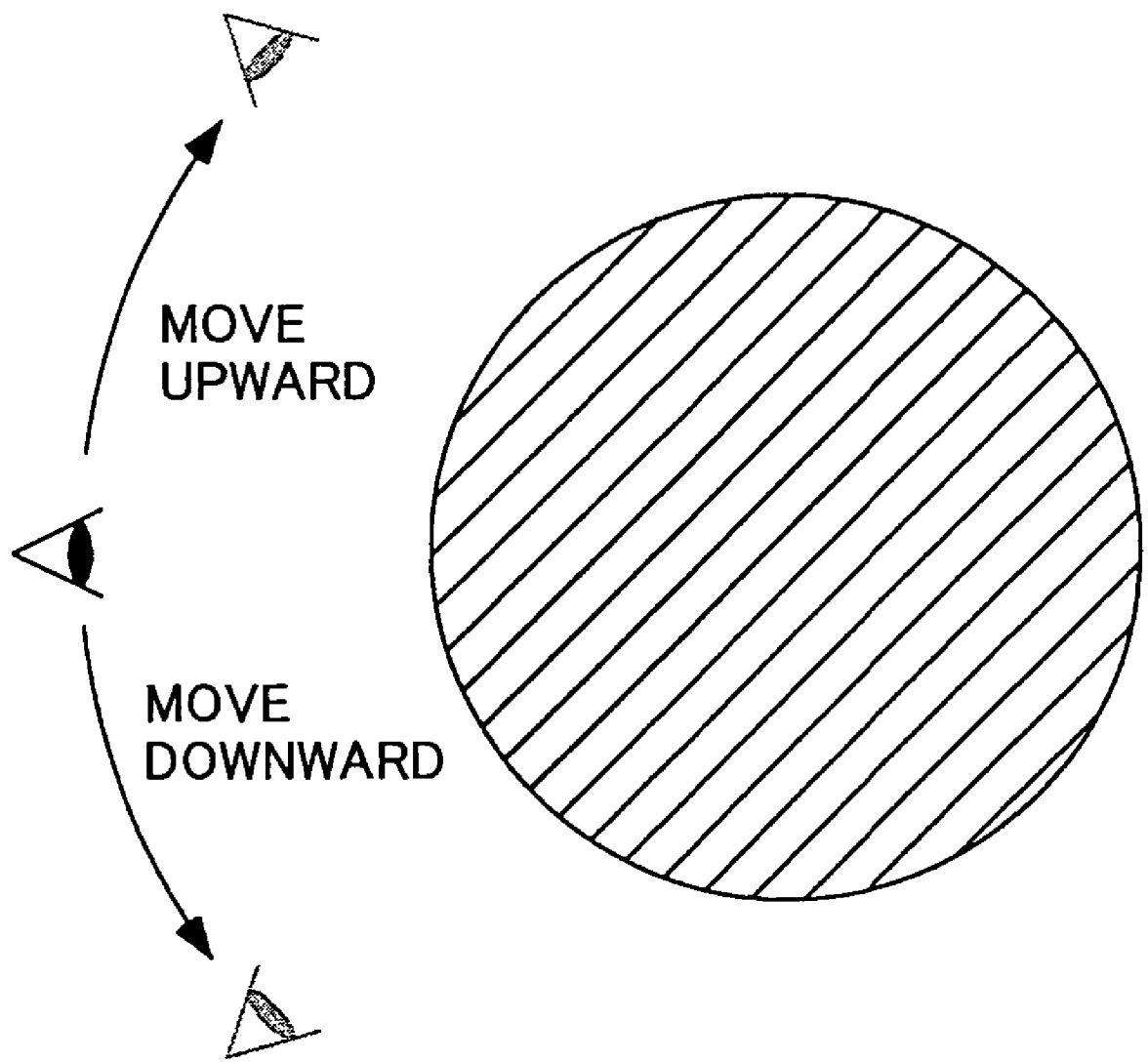
FIG. 22 is a diagram showing a direction example of the viewpoint movement in a case in which the information object being plane is the reference information object.

FIG. 22 is a diagram showing a direction example of the viewpoint movement in a case in which the information object being plane is the reference information object.

In FIG. 22, when the viewpoint location is moved upward or downward by the user operating the input unit 2014 with reference to the reference information object being plane, the viewpoint location is moved along the spherical surface.

In order to realize movement examples as shown in FIG. 21 and FIG. 22, the geometric model information 2202 of the link structure 2026 in FIG. 17 that each of the information objects has is used. The direction and the endpoints of the plane are recorded if the information object is plane, and the location of the center and the radius length of the sphere are recorded if the information object is spherical. In addition, the movement method for the viewpoint corresponding to the shape recorded in the geometric model information 2202 is recorded. The above-described information recorded in the geometric model information 2202 is not necessary to be equal to the shape of the three-dimensional information object displayed in the screen, and is just to use the movement of the viewpoint. When the user operates the viewpoint movement, the geometric model information 2202 of the reference information object at this moment is checked, and the viewpoint is moved in accordance with the movement method defined in the geometric model.

If the geometric model information 2202 properly define each of the information objects, it is possible to realize a comfortable browsing screen with respect to various shapes by the same input operation. For example, even if the viewpoint is moved among the children information objects aligned on the surface of the information object having the geometric model of the plane and even if the viewpoint is moved among the children information objects aligned on the surface of the geometric model of the sphere, the children information objects can be sequentially displayed by the same operation.

Figure 23:
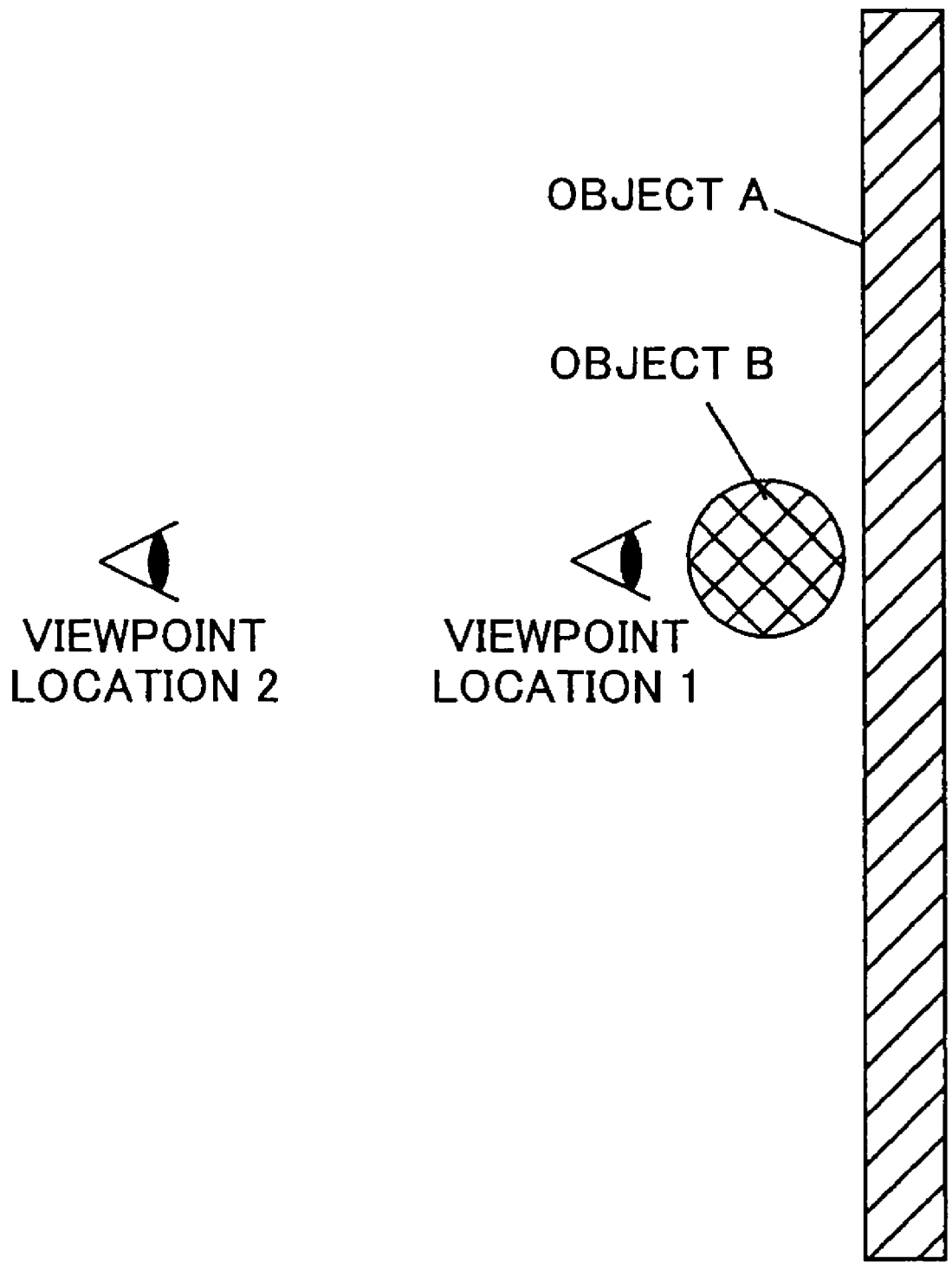
FIG. 23 is a diagram showing a state in which another smaller information object having a different geometric model positions in a front of the information object.

If a change of the movement speed corresponding to the distance from the reference information object and a change of the movement method using the geometric model information 2202 having the reference information object are simply used together, the operation of the user becomes difficult for user. For example, as shown in FIG. 23, in a case in which a small information object B having a geometric model of the sphere is positioned in front of a large information object A having a geometric model of the plane, if the reference information object is determined based on the distances from each of the information objects to the viewpoint location, the information object B always becomes the reference information object even if the viewpoint is positioned at a viewpoint location 1 or at a viewpoint location 2. Since the information object B is displayed larger in the screen when the viewpoint is positioned at the viewpoint location 1, it is not a problem that the information object B becomes the reference information object.

However, since the information object A is an object to be largely displayed when the viewpoint is positioned at the viewpoint location 2, if the information object B becomes the reference information object, the viewpoint ends up to move along the spherical surface according to the geometric model of the information object B. In this case, the reference information object subject to view does not correspond to the reference information object managing the viewpoint movement. As a result, the operation of the user becomes difficult.

As for this problem, three-dimensional data browsing apparatus 2000 processes a value obtained as the distance in the three-dimensional space and then uses the value. In order to process the distance, the value as the distance being a reference in each of three stages is used as shown in FIG. 24.

Figure 24:
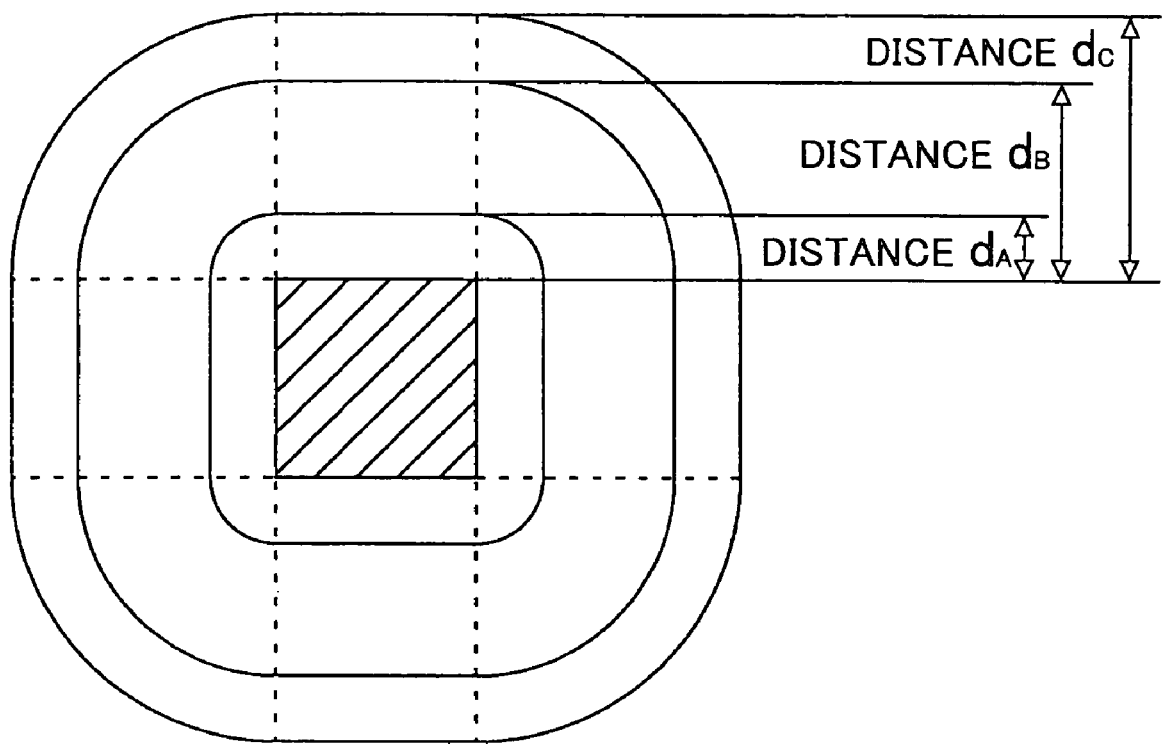
FIG. 24 is a diagram showing an example of a distance used as reference to conduct a distance process.

FIG. 24 is a diagram showing an example of the distance being the reference to conduct a viewpoint distance process.

In FIG. 24, oblique lines show the reference information object. The distance from the reference information object to the viewpoint location is divided into three distance ranges of a range to a distance dA, a range from the distance dA to a distance dB, and a range from the distance dB to a distance dC.

For example, in a case in which three distance ranges are set as shown in FIG. 24, in the step S2314 in FIG. 20, the viewpoint distance processing part 2022 in FIG. 14 is activated, and the viewpoint distance process for determining the distance to the viewpoint location is executed. That is, three reference distances dA, dB, and dC are provided in near order from the surface of the geometric model, and a process method is changed depending on the distance where the viewpoint is positioned.

Figure 25:
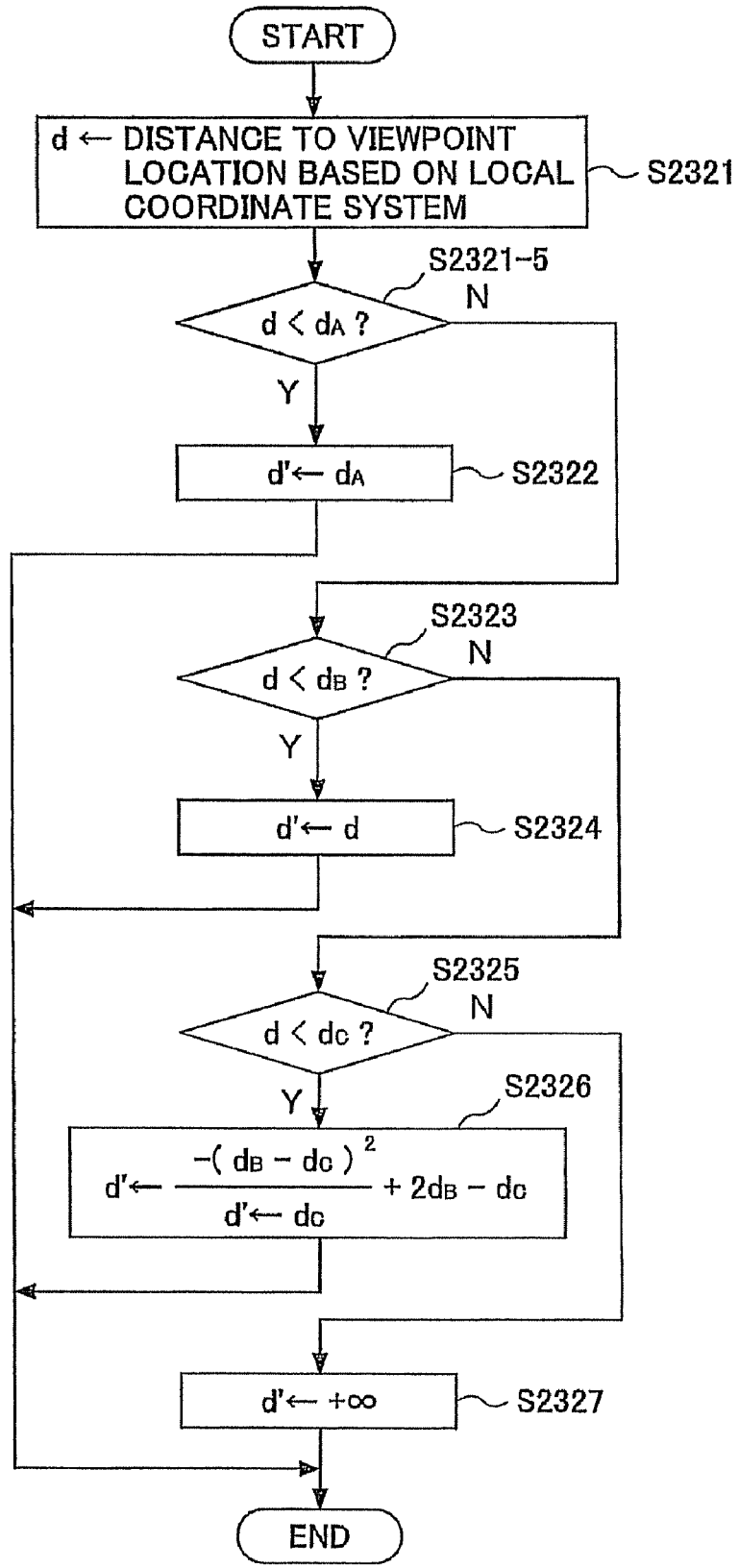
FIG. 25 is a flowchart diagram for explaining a viewpoint distance process.

FIG. 25 is a flowchart diagram for explaining for the viewpoint distance process. In FIG. 25, a value d denotes a distance before the viewpoint distance process and a value d' denotes a distance after the viewpoint distance process. The value d' after the viewpoint distance process is set as a value dn in the step S2314 in FIG. 20.

In FIG. 25, based on the local coordinate system determined using the geometric model information of the information object, the viewpoint distance processing part 2022 obtains the distance to the viewpoint location and sets the distance as the value d that is called a distance d hereinafter (step S2321). It is determined whether or not the distance d to the viewpoint location is shorter than the distance dA (step S2321-5). When the distance d to the viewpoint location is shorter the distance dA, the distance dA is set as the distance d to the viewpoint location (step S2322), and the viewpoint distance process is terminated. That is, in a range where the distance d is shorter than the distance dA, the distance d' is set to be a constant at the distance dA as a process result, and the distance d' is managed not to be changed depending on the distance d. This is a process for guaranteeing a minimum speed. It is possible to avoid the movement speed being extremely slow in the location relationship between the view and each of the information objects other than the reference information object.

On the other hand, when the distance d to the viewpoint location is more than the distance dA, it is determined whether or not the distance d to the viewpoint location is shorter than the distance dB (step S2323). When the distance d to the viewpoint location is shorter than the distance dB, the distance d to the viewpoint location is set to the distance d' as the process result (step S2324). Then, the viewpoint distance process is terminated. That is, within a range where the distance d is more than the distance dA and shorter than the distance dB, the distance d is not processed and remained at the distance d'. Within this range, the above-described process for changing the movement speed is conducted.

On the other hand, when the distance d to the viewpoint location is more than the distance dB, it is further determined whether or not the distance d to the viewpoint is shorter than the distance dc (step S2325). When the distance d to the viewpoint location is more than the distance dC, as the process result, infinity is set to the distance d' (step S2327). Then, the viewpoint distance process is terminated.

On the other hand, when the distance d to the viewpoint location is shorter than the distance dC, that is, within a range where the distance d is more than distance dB and shorter than distance dC, the distance d' is calculated by the following expression (step S2324).

$$d' \leftarrow \frac{-(dB - dC)^2}{d - dC} + 2dB - dC$$

Figure 26:
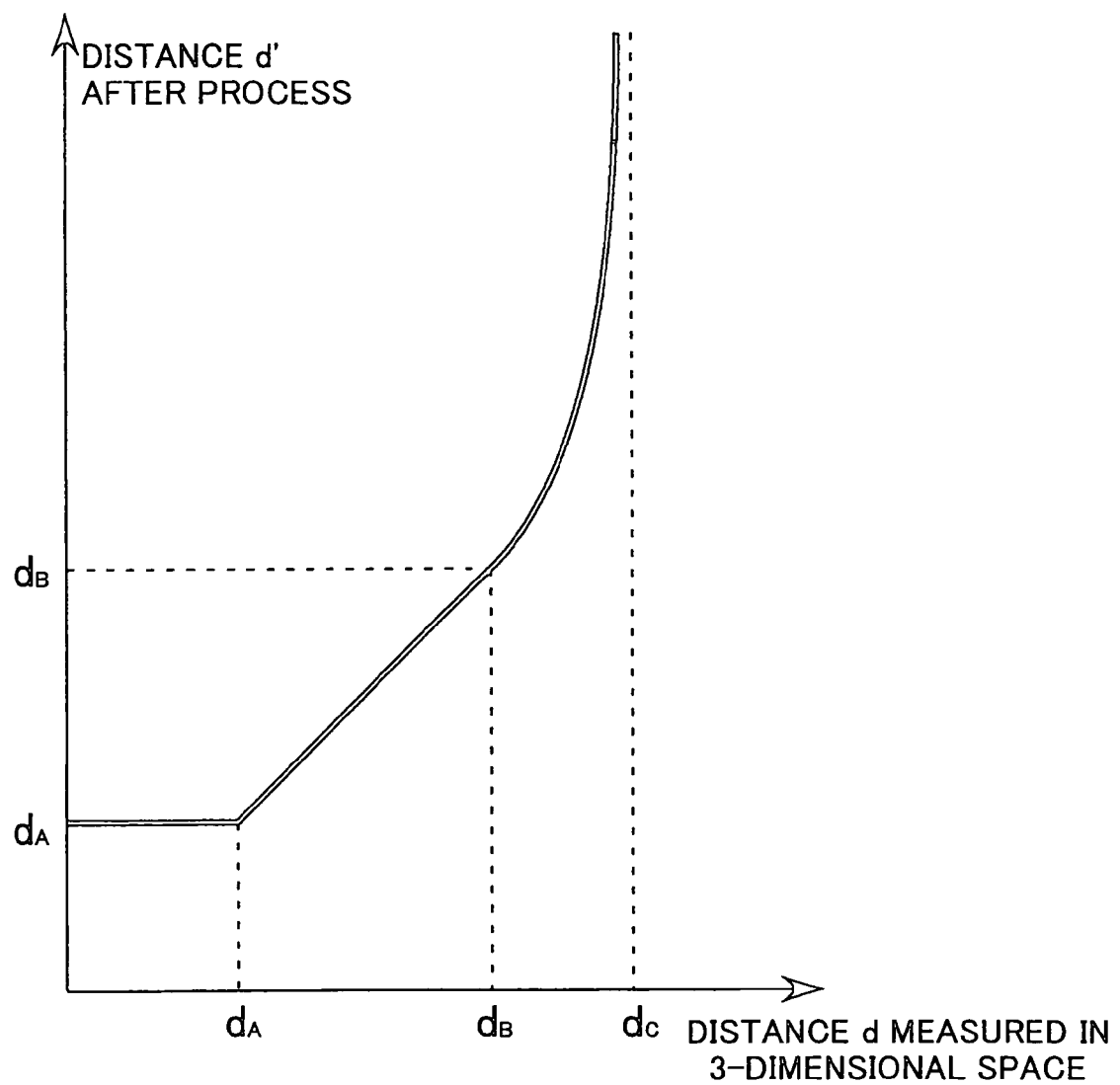
FIG. 26 is a graph diagram showing a correspondence between the distances before and after the viewpoint distance process.

This expression shows a function in that the distance d' becomes the distance dB when d=dB, the distance d' is increased accompanying with increasing the distance d from the distance dB, and then, the distance d' is asymptotically increased toward a positive infinity. That is, when the viewpoint location positions farther from the distance dB and closer to the distance dC, the distance d' becomes more then an actual distance. When the viewpoint location positions almost at the distance dC, the distance d' becomes almost infinity. And when the distance d is more than the distance dC, the distance d' becomes the positive infinity. A graph showing relationship between the distance d and the distance d' is shown in FIG. 26. As known from the graph, the distance d' before the viewpoint distance process becomes a consecutive value with respect to the distance d after the viewpoint distance process. Accordingly, the movement speed cannot be changed quickly.

The viewpoint distance process is conducted in the local coordinate system of each of the information objects. The distance d' obtained in the local coordinate system of each of the information objects is converted into a value in the local coordinate system of a current reference information object. And the values converted from the distances d' are compared with each other. As a result, the information object having the smallest value is set as the reference information object. In order to convert the value into the distance d' in the local coordinate system of the current reference information object, the value is inversely converted based on the coordinate transformation matrix 2212 stored in the link information 2202 of the link structure 2026.

Therefore, it is possible to properly select the reference information object even in the status as shown in FIG. 23 by processing the distance d.

Figure 27:
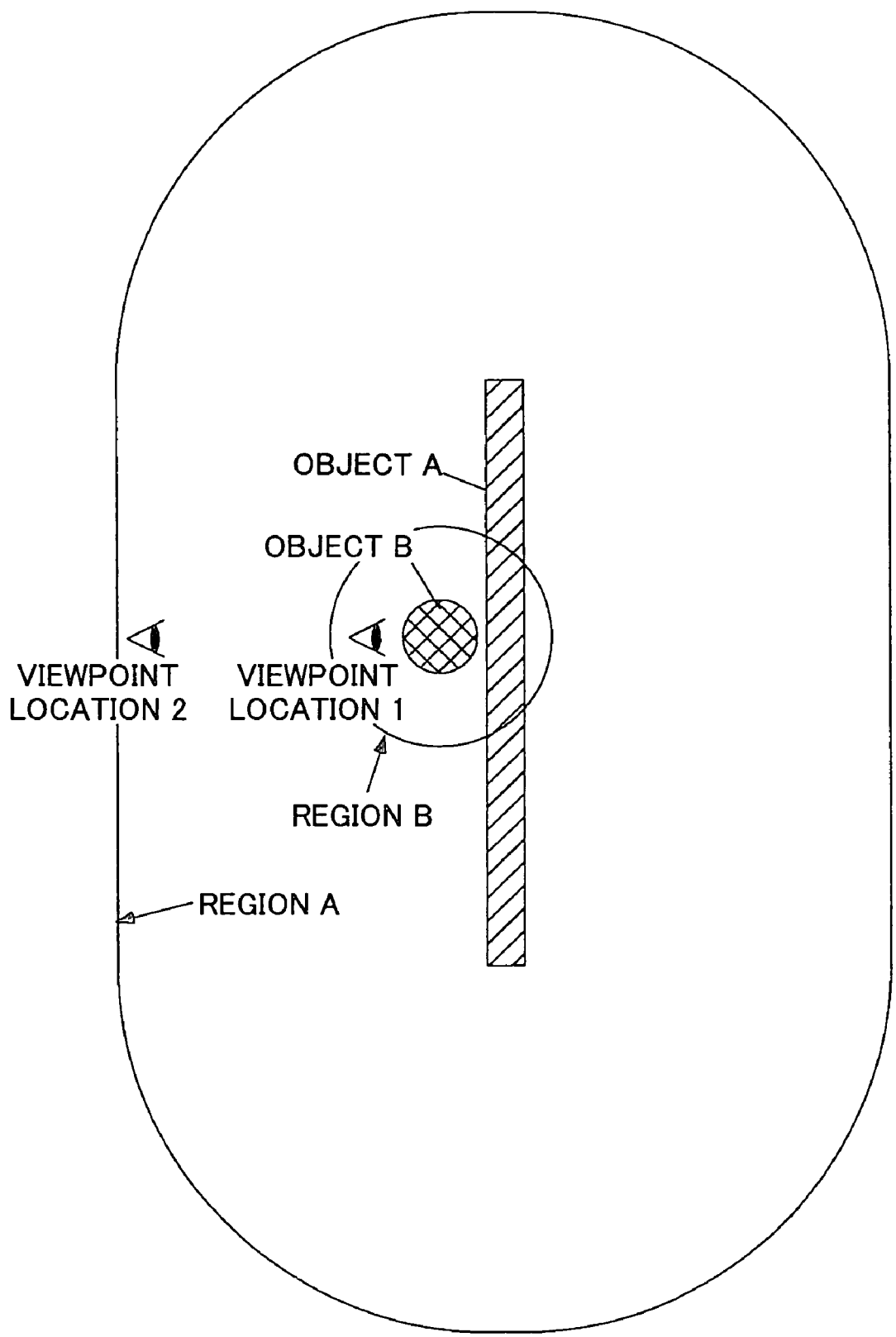
FIG. 27 is a diagram for explaining an example of the viewpoint distance process in a case in which two information objects having different geometric models position in a viewpoint direction.

FIG. 27 is a diagram for explaining an example of the viewpoint distance process in a case in which two information objects having different geometric models position in a viewpoint direction.

The range where the distance d is shorter than the distance dC in the local coordinate system of the information object A in FIG. 23 is shown as a range A in FIG. 27, and the range where the distance d is shorter than the distance dC in the local coordinate system of the information object B in FIG. 23 is shown as a range B in FIG. 27. In FIG. 27, when the viewpoint is positioned at a viewpoint location 1, the information object B is located at the closest location. Accordingly, in this case, the information object B is set as the reference information object. On the other hand, when the viewpoint is positioned at a viewpoint location 2, the information object B is located closer to the viewpoint location 2 as a simply measured distance. However, since the distance to the viewpoint location is more than the distance dC in the local coordinate system of the information object B, the distance to the viewpoint becomes infinity after the viewpoint distance process. Since the distance to the viewpoint is shorter than the distance dC in the local coordinate system of the information object A, the distance with respect to the information object A becomes shorter than that with respect to the information object B after the viewpoint distance. As a result, the information object A is set as the reference information object. Therefore, the above-described problem can be eliminated.

Figure 28:
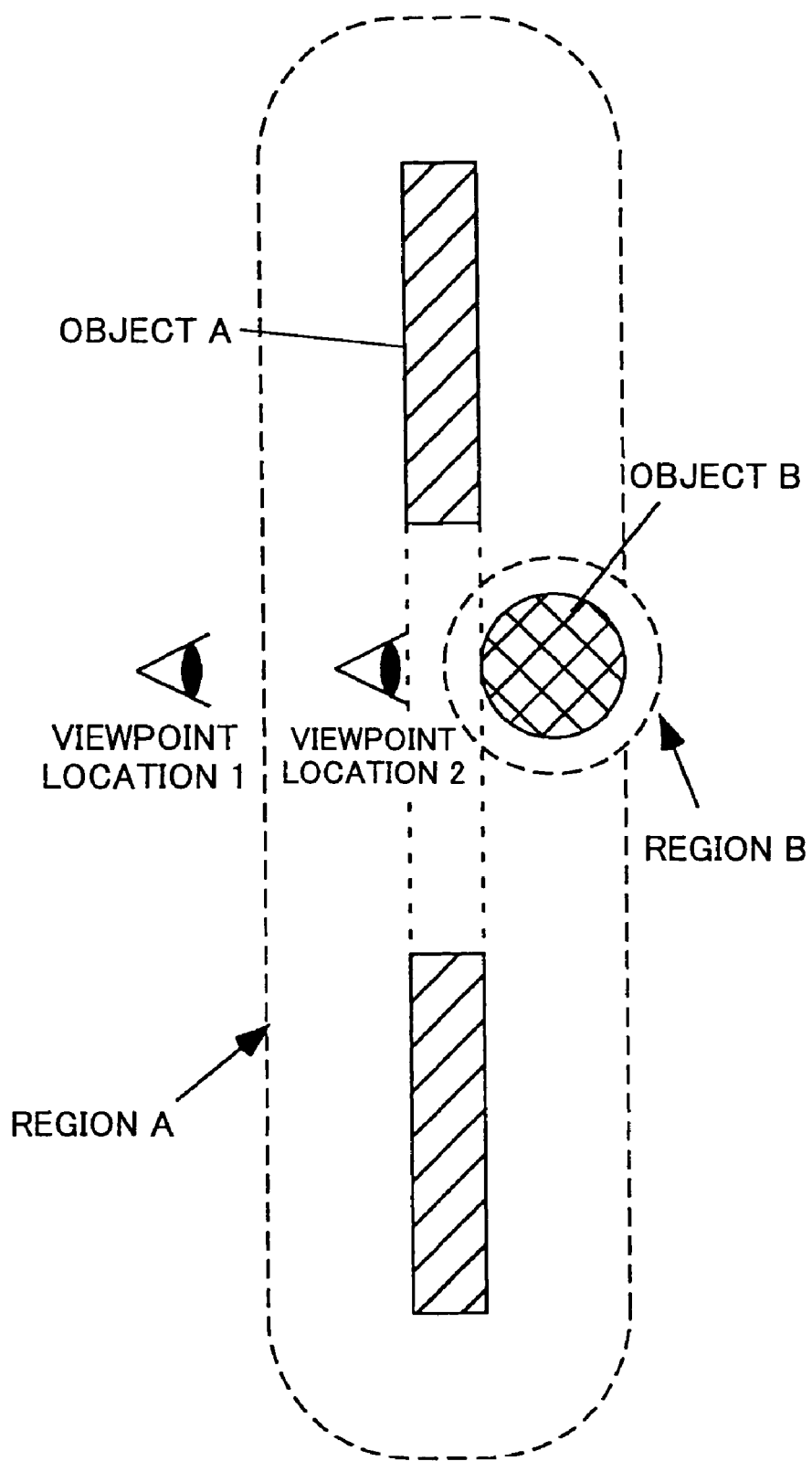
FIG. 28 is a diagram for explaining an example of the viewpoint distance process in a case in which an information object is viewed from the information object having a different geometric model.

As shown in FIG. 28, a transparent portion is in the information object A. A state, in which the information object B located farther than the information object A is viewed through that transparent portion, will be considered.

FIG. 28 is a diagram for explaining an example of the viewpoint distance process in a case in which an information object is viewed from the information object having a different geometric model.

In this state, if the viewpoint distance process described above and shown in FIG. 25 is not conducted in the case in which the distance d to the viewpoint is closer than the distance dA, the viewpoint approaches the information object B from the viewpoint location 1 and a distance from the viewpoint to the information object A becomes near to speed zero. Thus, even if the viewpoint tries to approach from the viewpoint location 1 to the information object B, the viewpoint cannot pass through the information object A to approach the information object B. Also, when the viewpoint positions at the viewpoint location 2, the information object A is always located closer to the viewpoint. Accordingly, the information object A becomes the reference information object. In spite of greatly displaying the information object B on the screen, the view movement method follows the geometric model of the information object A. The view movement method for moving the view along the plane is applied. On the contrary, in a case in which the viewpoint distance process described above and shown in FIG. 25 is conducted so that the distance closer to the information object B than the distance dA is set to be constant where the range A is the range in which the distance is less than the distance dA in the local coordinate system of the information object A and the range B is the range in which the distance is less than the distance dB in the local coordinate system of the information object B, the distance with respect to the information object B after the viewpoint distance process becomes smaller than that with respect to the information object A and the information object B becomes the reference information object at the viewpoint location 2. As described above, a certain range is provided for a case in that the viewpoint is positioned closer than a predetermined distance, as well as a case in that the viewpoint is positioned farther than a predetermined distance. Consequently, based on the viewpoint location, it is possible to properly select the reference information object.

According to the above-described embodiment, in the three-dimensional data browsing apparatus 2000, it is possible to obtain the distance from the surface of the information object to the viewpoint location along the shape of the information object based on the geometric model information.

In a case in which there are a plurality of the information objects, it is possible to determined the information object having the distance closer to the viewpoint based on the geometric model information, as the reference information object.

It is possible to conduct the viewpoint movement based to three-dimensional shape data by determining the reference information object. Moreover, the movement speed can be changed depending on the distance from the reference information object to the viewpoint location. Therefore, it can be realized to brows details of from the entire reference information object at a proper movement speed for the viewpoint location.

Moreover, it is possible to determine, as the reference information object, the information object having the distance being the closest to the viewpoint in the distances to the viewpoint location that are determined based on the local coordinate systems of the plurality of the information object, respectively, and based on predetermined ranges from the information objects to the viewpoint. Therefore, even if the viewpoint location is positioned farther from or closer to the information object, it is possible to properly determine the reference information object, so that the viewpoint movement can be conducted at a smooth speed.

In the above-described examples, a process by the view determining part 104 shown in FIG. 2 corresponds to a view determining part, and a process by the display image generating part 105 shown in FIG. 2 corresponds to a display image generating part.

In the above-described examples, a process by the reference information object determination processing part 2021 shown in FIG. 14 corresponds to a reference determining part and a speed changing part, and a process by the viewpoint distance processing part 2022 shown in FIG. 14 corresponds to a distance processing part.

The invention claimed is:

1. A viewpoint location controlling apparatus for controlling a viewpoint location with respect to a plurality of information objects having shapes displayed in a three-dimensional virtual space, said viewpoint location controlling apparatus comprising:
   a data managing part managing information object data including geometric information geometrically showing a shape of an information object;
   a distance processing part calculating a viewpoint distance from the information object to the viewpoint location, based on the geometric information of the information object, in a local coordinate system determined by the geometric information of the information object;
   a first setting part setting a first predetermined value as a processed distance between the information object and the viewpoint location when the calculated viewpoint distance is less than the first predetermined value;
   a second setting part setting the calculated viewpoint distance as the processed distance when the calculated viewpoint distance is equal to or greater than the first predetermined value and is less than a second predetermined value;
   a third setting part calculating a value calculated by using a function that asymptotically increases towards positive infinity to the calculated viewpoint distance between the information object and the viewpoint location, and setting the value as the processed distance when the calculated viewpoint distance is equal to or greater than the second predetermined value and is less than a third predetermined value;
   a fourth setting part setting a maximum distance as the processed distance when the calculated viewpoint distance is equal to or greater than the third predetermined value;
   a reference determining part determining a reference object indicating the information object that is closest to the viewpoint location; and
   a speed changing part changing a movement speed of a view by corresponding to the processed distance based on the calculated viewpoint distance from the determined reference object to the viewpoint location, where based on the reference information object, the viewpoint location is controlled so as to move the viewpoint at the movement speed corresponding to the processed distance, and the plurality of the information objects are displayed.

2. The viewpoint location controlling apparatus as claimed in claim 1, wherein said first setting part sets the first predetermined value as the processed distance to be constant.

3. The viewpoint location controlling apparatus as claimed in claim 1, wherein said reference determining part determines the information object closest to the viewpoint based on the processed distance as the reference information object.

4. A method for controlling a viewpoint location with respect to a plurality of information objects having shapes displayed in a three-dimensional virtual space, said method comprising:
   causing a processor device to calculate a viewpoint distance from an information object to the viewpoint location, based on geometric information of the information object, in a local coordinate system determined by the geometric information of the information object;
   causing a processor device to set a first predetermined value as a processed distance between the information object and the viewpoint location when the calculated viewpoint distance is less than the first predetermined value;

causing a processor device to set the calculated viewpoint distance as the processed distance when the calculated viewpoint distance is equal to or greater than the first predetermined value and is less than a second predetermined value;

causing a processor device to set a value calculated by using a function that asymptotically increases towards positive infinity to the calculated viewpoint distance between the information object and the viewpoint location, and setting the value as the processed distance when the calculated viewpoint distance is equal to or greater than the second predetermined value and is less than a third predetermined value;

causing a processor device to set a maximum distance as the processed distance when the calculated viewpoint distance is equal to or greater than the third predetermined value;

causing a processor device to determine a reference object indicating the information object that is closest to the viewpoint location; and causing a processor device to change a movement speed of a view by corresponding to the processed distance based on the calculated viewpoint distance from the determined reference object to the viewpoint location, where based on the reference information object, the viewpoint location is controlled so as to move the viewpoint at the movement speed corresponding to the processed distance, and the plurality of the information object are displayed.

5. A non-transitory computer-readable recording medium recorded with program code causing a computer to perform a process in a viewpoint location controlling apparatus for controlling a viewpoint location with respect to a plurality of information objects having shapes displayed in a three-dimensional virtual space, said process comprising:

calculating a viewpoint distance from an information object to the viewpoint location, based on geometric information of the information object, in a local coordinate system determined by the geometric information of the information object;

setting a first predetermined value as a processed distance between the information object and the viewpoint location when the calculated viewpoint distance less than the first predetermined value;

setting the calculated viewpoint distance as the processed distance when the calculated viewpoint distance is equal to or greater than the first predetermined value and is less than a second predetermined value;

setting a value calculated by using a function the asymptotically increases towards positive infinity to the calculated viewpoint distance between the information object and the viewpoint location, and setting the value as the processed distance, when the calculated viewpoint distance is equal to or qreater than the second predetermined value and is less than a third predetermined value;

setting a maximum distance as the processed distance when the calculated viewpoint distance is equal to or greater than the third predetermined value;

determining a reference object indicating the information object that is closest to the viewpoint location;

changing a movement speed of a view by corresponding to the processed distance based on the calculated viewpoint distance from the determined reference object to the viewpoint location, where based on the reference information object, the viewpoint location is controlled so as to move the viewpoint at the movement speed corresponding to the processed distance, and the plurality of the information objects are displayed.

6. A method for controlling a viewpoint location with respect to a plurality of information objects having shapes displayed in a three-dimensional virtual space, said method comprising:

said controlling being executed via a processor device and including:

causing a processor device to determine, from among the information objects, a closest information object to the viewpoint location;

causing a processor device to obtain a first distance, in a local coordinate system determined by geometric information geometrically showing a shape of the closest information object, from the closest information object to the viewpoint location;

causing a processor device to set a second distance to the first distance when the first distance is between a first predetermined value and a second predetermined value larger than the first predetermined value;

causing a processor device to calculate the second distance, when the first distance is larger than the second predetermined value, based on a function that asymptotically increases towards positive infinity as the first distance approaches a third predetermined value; and causing a processor device to display the information objects while changing a movement speed of a view based on the second distance, as the viewpoint location is controlled to move the viewpoint location at the movement speed.

* * * * *

UNITED STATES PATENT AND TRADEMARK OFFICE
CERTIFICATE OF CORRECTION

PATENT NO. : 7,812,841 B2  
APPLICATION NO. : 11/320345  
DATED : October 12, 2010  
INVENTOR(S) : Toru Kamiwada et al.

It is certified that error appears in the above-identified patent and that said Letters Patent is hereby corrected as shown below:

Column 28, Line 6 delete "qreater" and insert -- greater --, therefor.

Signed and Sealed this
Fourth Day of January, 2011

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,812,841 B2 |
| APPLICATION NO. | : 11/320345 |
| DATED | : October 12, 2010 |
| INVENTOR(S) | : Toru Kamiwada et al. |

It is certified that error appears in the above-identified patent and that said Letters Patent is hereby corrected as shown below:

First Page, Column 1, After Related U.S. Application Data, Insert Item 30

--Foreign Application Priority Data

Feb. 23, 2001   (JP)................................2001-048770--

Signed and Sealed this
Nineteenth Day of July, 2011

David J. Kappos
*Director of the United States Patent and Trademark Office*